United States Patent

Landholm et al.

[11] 4,013,635
[45] * Mar. 22, 1977

[54] CYAN AZO DYE-PROVIDING COMPOUNDS

[75] Inventors: Richard A. Landholm; Jan R. Haase, both of Rochester, N.Y.; James J. Krutak, Sr., Kingsport, Tenn.

[73] Assignee: Eastman Kodak Company, Rochester, N.Y.

[ * ] Notice: The portion of the term of this patent subsequent to Jan. 13, 1993, has been disclaimed.

[22] Filed: Feb. 26, 1975

[21] Appl. No.: 553,381

[52] U.S. Cl. ............................... 260/199; 96/3; 96/29 R; 96/29 D; 96/55; 96/56.1; 96/66 R; 96/66 HD; 96/73; 96/77; 260/152; 260/162; 260/163; 260/184; 260/187; 260/198; 260/200; 260/490; 260/509; 260/543 F; 260/556 B; 260/559 A

[51] Int. Cl.² ............... C09B 29/10; C09B 29/20; G03C 5/30; G03C 5/54

[58] Field of Search .......... 260/162, 163, 152, 198, 260/199, 200, 184, 187

[56] References Cited

UNITED STATES PATENTS

| | | | |
|---|---|---|---|
| 2,983,608 | 5/1961 | Beavers | 260/163 X |
| 3,148,062 | 9/1964 | Whitmore et al. | 260/157 X |
| 3,558,700 | 2/1971 | Kimura et al. | 260/163 X |
| 3,751,406 | 8/1973 | Bloom et al. | 260/162 |
| 3,932,380 | 1/1976 | Krutak et al. | 260/197 |

*Primary Examiner*—Floyd D. Higel
*Attorney, Agent, or Firm*—Elliott Stern; Daniel B. Reece, III

[57] ABSTRACT

Cyan azo dye-providing compounds having the formula

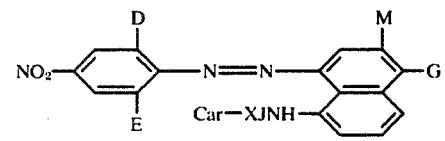

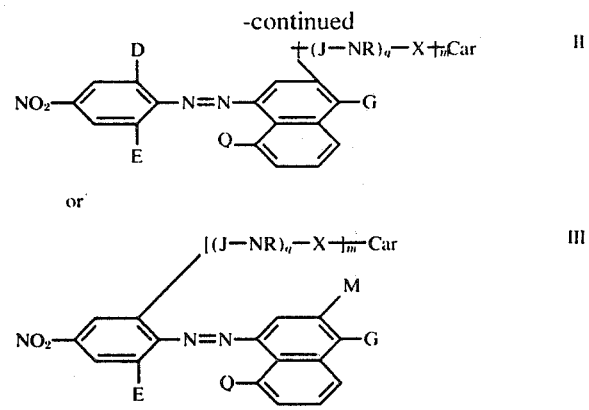

wherein

Car represents a carrier moiety which, as a function of oxidation under alkaline conditions, releases a diffusible dye from said compound;

X represents a bivalent linking group;

R represents hydrogen or alkyl;

J represents sulfonyl or carbonyl;

m and q each represent an integer having a value of 0 or 1;

Q represents hydroxy or acylamino;

G represents a hydroxy radical, a salt thereof, or a hydrolyzable acyloxy group;

D represents halogen, cyano, nitro, trifluoromethyl, alkyl, alkoxy, carboxy, a carboxylic acid ester, fluorosulfonyl, trifluoromethylsulfonyl, —SO₃—phenyl radical, sulfo, a sulfamoyl radical, a carbamoyl radical, an alkyl- or alkylsulfonyl radical, or a phenylsulfonyl radical;

E represents hydrogen, halogen, nitro, cyano, or trifluoromethyl; and

M represents sulfo, cyano, fluorosulfonyl, halogen, a -SO₃-phenyl radical, an alkylsulfinyl radical, a phenylsulfinyl radical; a sulfamoyl radical, a carbamoyl radical, an alkylsulfonyl radical, or a phenylsulfonyl radical;

with the proviso that there be no more than one sulfo radical and no more than one carboxy radical present in said compound.

12 Claims, No Drawings

CYAN AZO DYE-PROVIDING COMPOUNDS

This invention relates to the art of photography and more particularly, to color diffusion transfer photography employing cyan dye-providing compounds.

Color diffusion transfer processes generally involve the use of a photographic element comprising a support, at least one silver halide emulsion layer and an image dye-providing material contained in or contiguous to the layer. The image dye-providing material typically can be thought of as having the structure Car-Col wherein Col is a colorant such as a dye or a dye precursor and Car is an associated carrier or monitoring group which as a function of alkaline processing effects a substantial change in the diffusivity of at least the Col portion of the compound.

After exposure, a photographic element as described above is treated with an alkaline processing solution to effect imagewise discrimination in the element. As mentioned previously, the imagewise discrimination is generally brought about by the monitoring or carrier group which, in the presence of the alkaline processing solution, is responsible for a substantial change in the diffusivity of at least the dye portion of the dye-providing material. As is known in the art, the dye-providing material can be initially immobile or initially mobile in the processing solution. Upon alkaline processing of an initially immobile dye-providing material, a mobile dye can be released imagewise or the material can be imagewise rendered soluble and thus mobile. If the material is initially mobile, the processing solution typically renders the material insoluble (and thus immobile) in an imagewise fashion.

It is well known in the art to utilize image dye-providing materials in a photographic element wherein an imagewise exposed element can be contacted with an alkaline processing solution to effect an imagewise difference in mobility of at least a portion of the dye-providing material, i.e., to effect release of a dye or dye precursor, to render the compound insoluble or soluble. It is the particular carrier or monitoring group that determines what form the change in diffusivity (of at least the dye portion of the material) will take. In certain instances, an increase in solubility of a given compound can be accomplished by substantially reducing the molecular weight of the compound; see, for example, the disclosure of Gompf U.S. Pat. No. 3,698,897, issued Oct. 17, 1972, in Fleckenstein et al allowed published Ser. No. 351,673, filed Apr. 16, 1973, entitled PHOTOGRAPHIC SYSTEMS, in Hinshaw et al Ser. No. 326,628, filed Jan. 27, 1973, now abandoned, entitled POSITIVE-WORKING IMMOBILE PHOTOGRAPHIC COMPOUNDS AND PHOTOGRAPHIC ELEMENTS CONTAINING SAME, in Anderson et al U.S. Pat. No. 3,725,062, entitled COLOR DIFFUSION TRANSFER PROCESSES and others. Exemplary of systems wherein the dye-providing compound splits off a dye are those described in Whitmore U.S. Pat. No. 3,227,552, issued Jan. 4, 1966, and Bloom U.S. Pat. No. 3,443,940, issued May 13, 1969, and Canadian Pat. No. 602,607, issued Aug. 2, 1960. Similarly, Yutzy U.S. Pat. No. 2,756,142, issued July 24, 1956, U.S. Pat. No. 2,774,668, issued Dec. 18, 1956, and U.S. Pat. No. 2,983,606, issued May 9, 1961, describe photographic elements wherein a dye-providing compound is rendered immobile in an imagewise fashion.

All of these systems have utility; however, it is desired to provide new compounds which provide new dyes having especially advantageous properties, such as improved hue, diffusibility, mordantability and the like.

We have found a class of cyan, azo dye-providing compounds well suited for use in color diffusion transfer color elements. The dye-providing compounds, as a function of typical processing under alkaline conditions, release a diffusible cyan-colored substance from the compound. They are related to the dye-providing compounds described in U.S. Pat. No. 3,942,987 but are distinguished in having an electron-withdrawing group in the 2-position of the 1-naphthol part of the azo dye molecule in combination with a hydrogen-bonding group in the 5-position. Dyes of this configuration have unexpectedly superior light stability and superior hue stability over the wide range of pH used in the integral-negative-receiver (INR) system when wet, during and subsequent to processing, and after the laminate has dried.

In the color transfer process, particularly in the integral-negative-receiver (INR) format described in Example 40 of Fleckenstein and Figueras allowed U.S. Ser. No. 351,763, the dye-releasing redox compounds (DRR's) preferably should possess the following properties: (a) rapid oxidation in the presence of a 3-pyrazolidone-silver halide redox couple; (b) rapid cleavage of the oxidized form by alkali; (c) stability on long time storage and high pH processing conditions; (d) immobility before processing and dye release; and (e) solubility in water-immiscible solvents for ease in dispersing in gelatin.

Besides these desirable properties of the DRR's themselves, the release dyes preferably have the following important additional properties: (a) diffusion: through gelatin and other components of INR element; (b) required hue: suitable Dmax, half band width (width spectrum at 1/2 the Dmax) and absence of unwanted absorption; (c) chemical stability; (d) solubility at high pH; (e) mordantability at high pH; (f) permanence: non-wandering on mordant at neutral pH; (g) hue stability over pH range of system; (h) light stability; (i) hue stability on the mordant in a changing environment; both wet at the time of initial transfer and in the eventually dried final print; and (j) low solubility at low pH.

The cyan, azo dye-providing compounds of this invention as well as the dyes thus provided exhibit these desirable characteristics. Typically, these compounds are utilized in a photosensitive element which comprises a support having thereon at least one photosensitive silver halide emulsion, and at least one of said layers having associated therewith a cyan, azo dye-providing compound of this invention.

The compounds of this invention can be represented by the following formulas:

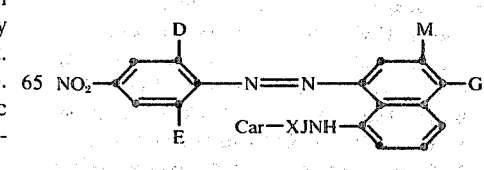

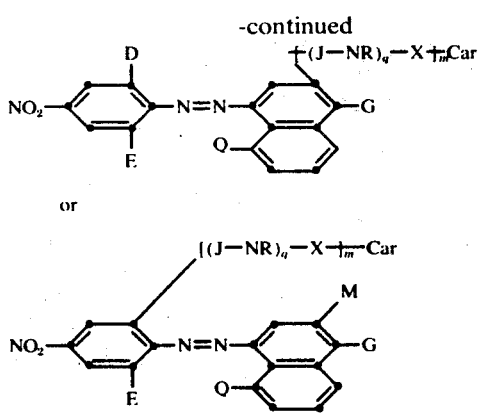

-continued

Car represents a carrier moiety which, as a function of oxidation under alkaline conditions, releases a diffusible dye from said compound;

X represents a bivalent linking group of the formula $-R^2-L_n-R^2_p-$ where each $R^2$ can be the same or different and each represents an alkylene radical having 1 to about 8 carbon atoms; a phenylene radical, or a substituted phenylene radical having 6 to about 9 carbon atoms (e.g., phenyl substituted with chloro, nitro, bromo, cyano, methoxy, methyl, ethyl, carboxy or sulfo; L represents a bivalent radical selected from oxy, carbonyl, carboxamido, carbamoyl, sulfonamido, sulfamoyl, sulfinyl or sulfonyl; n is an integer having a value of 0 or 1; p is 1 when n equals 1 and p is 1 or 0 when n equals 0, provided that when p is 1 the carbon content of the sum of both $R^2$ radicals does not exceed 14 carbon atoms;

R represents a hydrogen atom, or an alkyl radical having 1 to about 6 carbon atoms;

J represents a bivalent radical selected from sulfonyl or carbonyl;

m and q each represent an integer having a value of 0 or 1;

Q represents a hydroxy radical or a radical having the formula $-NHCOR^3$ or $-NHSO_2R^3$ wherein $R^3$ is an alkyl radical having 1 to about 6 carbon atoms, a substituted alkyl radical having 1 to about 6 carbon atoms (e.g., alkyl substituted with hydroxy, cyano, sulfamoyl, carboxy, or sulfo); benzyl, phenyl, or a substituted phenyl radical having 6 to about 9 carbon atoms (e.g., phenyl substituted with carboxy, cyano, chloro, methoxy, methyl or sulfamoyl);

G represents a hydroxy radical, a salt thereof, or a hydrolyzable acyloxy group having the formula:

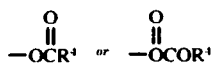

wherein $R^4$ is an alkyl radical having 1 to about 18 carbon atoms, phenyl or substituted phenyl having 6 to about 18 carbon atoms (e.g., phenyl substituted with chloro, nitro, an alkyl radical of up to 12 carbon atoms);

D represents a halogen atom, a cyano radical, a nitro radical, a trifluoromethyl radical, an alkyl radical having 1 to about 6 carbon atoms, an alkoxy radical having 1 to about 6 carbon atoms, a carboxy radical, a carboxylic acid ester having the formula $-COOR^4$ wherein $R^4$ is as described previously, a fluorosulfonyl radical, a trifluoromethylsulfonyl radical, a $-SO_3$-phenyl radical or a substituted $-SO_3$-phenyl radical having 6 to about 9 carbon atoms, a sulfo radical, a sulfamoyl radical having the formula $-SO_2NR^5R^6$ wherein $R^5$ represents hydrogen or an alkyl group having 1 to about 6 carbon atoms and $R^6$ represents hydrogen, an alkyl radical having 1 to about 6 carbon atoms, a substituted alkyl radical having 1 to about 6 carbon atoms, a benzyl radical, a phenyl radical, a substituted phenyl radical having 6 to about 9 carbon atoms, an alkyl carbonyl radical having 1 to about 8 carbon atoms, or a phenyl carbonyl radical having 6 to about 9 carbon atoms, with the proviso that the carbon content of the sum of $R^5$ and $R^6$ not exceed 14 carbon atoms; also $R^5$ and $R^6$ may be combined with the nitrogen atom to which they are attached to form a morpholino or piperidino radical; a carbamoyl radical having the formula $-CON(R^5)_2$ wherein each $R^5$ can be the same or different and is as described previously, an alkyl- or substituted alkylsulfonyl radical having 1 to about 8 carbon atoms, a phenyl- or substituted phenylsulfonyl radical having 6 to about 9 carbon atoms;

E represents a hydrogen atom, a halogen atom, a nitro radical, a cyano radical or a trifluoromethyl radical; and M represents a sulfo radical, cyano, fluorosulfonyl, halogen, $-SO_3$-phenyl or a substituted $-SO_3$-phenyl having 6 to about 9 carbon atoms, an alkyl- or substituted alkylsulfinyl radical having 1 to about 8 carbon atoms; a phenylsulfinyl radical; a sulfamoyl radical having the formula $-SO_2NR^5R^6$, a carbamoyl radical having the formula $-CON(R^5)_2$ wherein $R^5$ and $R^6$ are as described previously; an alkyl- or substituted alkylsulfonyl radical having 1 to about 8 carbon atoms; or a phenyl or substituted phenylsulfonyl radical having 6 to about 9 carbon atoms;

with the proviso that there be no more than one sulfo radical and no more than one carboxy radical present in said compound.

As mentioned above, the present compounds contain a carrier moiety (Car-) which, as a function (direct or inverse) of oxidation under alkaline conditions, provides a substance having a mobility different than that of the starting compound. The dye-providing compounds of this invention are initially immobile compounds of which at least a portion is rendered mobile or diffusible as a function of development. Carriers useful in initially immobile dye-providing compounds such as those wherein the carrier, under alkaline conditions, effects a splitting off of a ballast group from the dye moiety are described further in Whitmore Canadian Pat. No. 602,607, dated Aug. 2, 1960, and Whitmore U.S. Pat. No. 3,227,552, issued Jan. 4, 1966, both incorporated herein by reference. Among the preferred dye-providing compounds are those in which the initially immobile carrier as a function of oxidation under alkaline conditions releases a diffusible dye. For example, useful carriers for compounds in which the carrier moiety undergoes intramolecular ring closure upon oxidation to split off a dye are described in U.S. Pat. Nos. 3,443,939, 3,443,940 and 3,443,941, all issued May 13, 1969, and all incorporated herein by reference. A preferred group of special initial immobile carriers useful in forming a diffusible substance as an inverse function of oxidation are described in copending Hinshaw and Condit application Ser. No. 326,628, now abandoned, filed Jan. 26, 1973, and entitled "Positive-Working Immobile Photographic Compounds and Photographic Elements Containing Same", incorporated herein by reference. Improved initially immobile dye-providing compounds which undergo redox reactions followed by alkali cleavage of the carrier to split off a dye are disclosed in Fleckenstein et al Ser. No. 351,673, filed Aug. 22, 1972, entitled "Photographic Systems", incorporated herein by reference. The ballasted phenolic and naphtholic carriers of Fleckenstein et al are especially preferred carrier moieties. Still other useful carriers are described in U.S. Pat. No. 3,628,952, issued Dec. 21, 1971.

Examples of bivalent alkylene linking groups representative of $R^2$ are —$CH_2$—, —$C_2H_4$—, —$C_6H_{12}$—, —$C_3H_6$—, —$C_4H_8$—, etc., as well as branched alkylene radicals such as

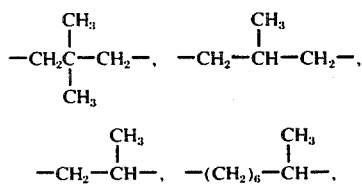

etc.

References hereinafter to *o*, *m* and *p* means that either the ortho, meta or para radicals are indicated, as the case may be.

Examples of phenylene and substituted phenylene radicals representative of $R^2$ are o,m,p-phenylene, o,m,p-phenylene substituted with chloro, methoxy, butoxy, bromo, cyano, nitro, methyl, ethyl, carboxy, sulfo, amino, etc.

As used herein the oxygen- or sulfur-containing bivalent radicals representative of L are oxy (—O—), carbonyl (—CO—), carboxamido (—CONH—), carbamoyl (—NHCO—), sulfonamido (—$SO_2NH$—), sulfamoyl (—$NHSO_2$—), sulfinyl (—SO—) and sulfonyl (—$SO_2$—). Therefore, non-limiting examples of bivalent linking groups which may be represented by X are —$CH_2$—O—$CH_2$—,

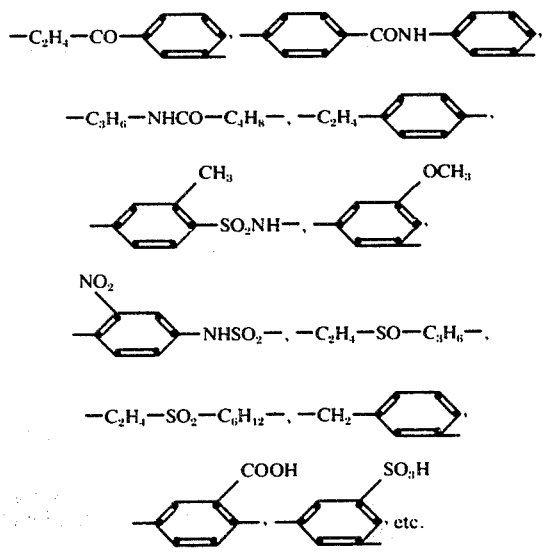

Examples of the groups which R may represent are hydrogen, methyl, ethyl, isopropyl, pentyl, hexyl, etc. The alkyl group represented by R may additionally be substituted with cyano, hydroxy, methoxy, etc.

Examples of groups representative of Q are a hydroxy radical or a radical having the formula —NHCOR³ or —NHSO₂R³ wherein R³ is as described previously such as —$NHCOCH_3$, —$NHCOC_2H_5$, —$NHCOC_6H_{13}$, —$NHCOC_2H_4CN$, —$NHCOC_3H_6SO_2NH_2$, —$NHCOCH_2C_6H_5$, —$NHCOC_6H_4COOH$, —$NHSO_2CH_3$, —$NHSO_2C_6H_4CN$, —$NHSO_2C_6H_4Cl$, —$NHSO_2C_2H_5$, —$NHCOC_3H_6SO_3H$, —$NHSO_2C_6H_4OCH_3$, etc.

Examples of the groups which G may represent are hydroxy, salts thereof such as alkali metal (e.g., —O⁻ Li⁺, —O⁻ K⁺, —O⁻ Na⁺) salts and photographically inactive ammonium salts thereof such as —O⁻⁺ $NH_4$, —O⁻⁺ $NH(CH_3)_3$, —O⁻⁺ $N(C_2H_5)_4$,

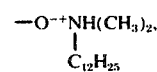

—O⁻⁺ $NH(C_{12}H_{25})_3$, —O⁻⁺ $NH(C_2H_5)_3$, O⁻

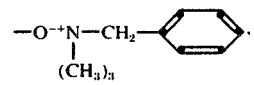

i.e., a trialkyl or tetralkyl ammonium salt (sometimes called "amine salts") which does not adversely affect the photographic utility of the cyan image dye-providing compound or the physical or chemical processes which occur during development of the image.

G may also advantageously represent a hydrolyzable acyloxy group having the formula $$-OCR^4 \quad \text{or} \quad -OCOR^4$$

wherein $R^4$ is as described previously. Non-limiting examples of these hydrolyzable groups are

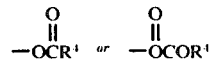

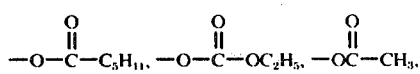

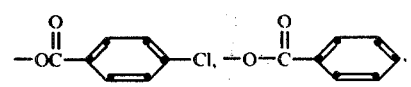

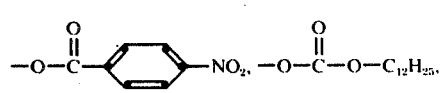

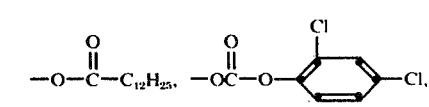

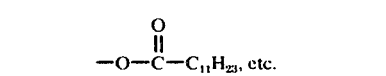

etc.

Examples of substituents which D may represent are chloro, bromo, fluoro, a cyano radical (—CN), a nitro radical (—$NO_2$), methyl, isopropyl, ethyl, butyl, hexyl, etc., methoxy, ethoxy, isopropoxy, hexyloxy, butoxy, a trifluoromethyl radical (—$CF_3$), a carboxylic acid ester such as —$COOCH_3$, —$COOC_{11}H_{23}$, —$COOC_2H_5$, —$COOC_6H_5$,

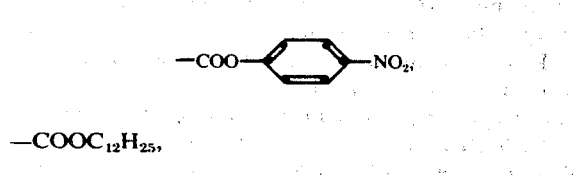

—COOC$_{12}$H$_{25}$, etc.; a carboxy radical including salts thereof, such as alkali metal salts or photographically inactive ammonium salts (e.g., —COOH, —COO$^-$ Li$^+$, —COO$^-$ K$^+$, —COO$^-$ Na$^+$, —COO$^-$ NH$_4^+$, etc.), a fluorosulfonyl radical (—SO$_2$F), a trifluoromethylsulfonyl radical (—SO$_2$CF$_3$), a —SO$_3$C$_6$H$_5$ radical,

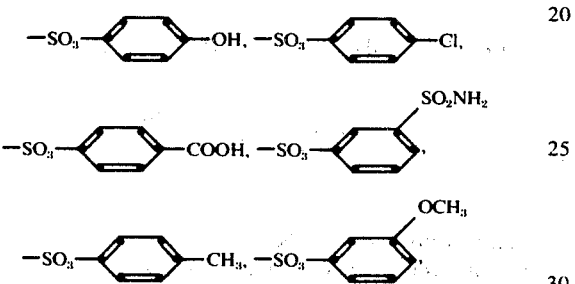

etc., a sulfo radical including salts thereof, such as alkali metal or photographically inactive ammonium salts (e.g., —SO$_3$H, —SO$_3^-$Li$^+$, SO$_3^-$K$^+$, —SO$_3^-$Na$^+$, —SO$_3^-$NH$_4^+$, etc.);

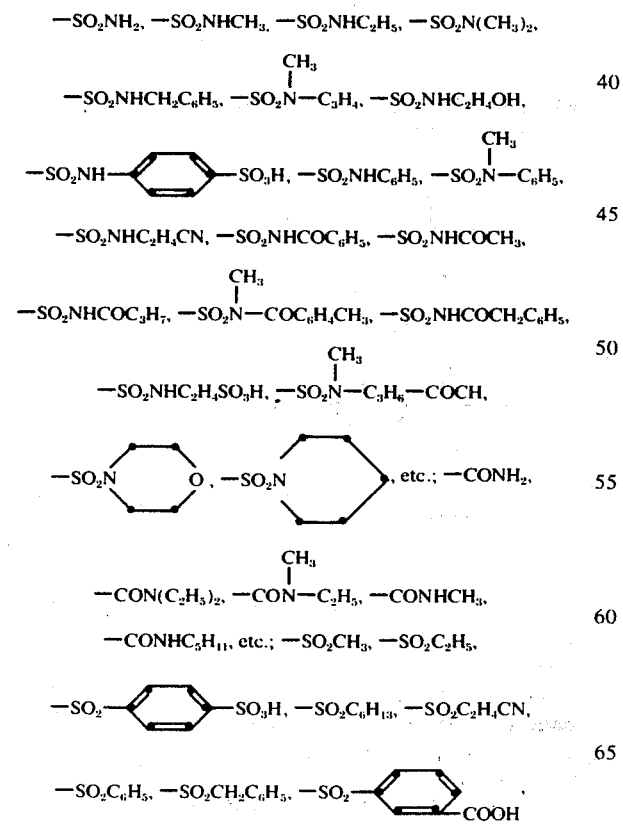

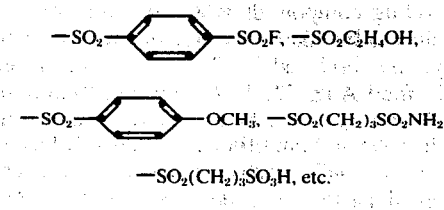

—SO$_2$(CH$_2$)$_3$SO$_3$H, etc.

Examples of substituents which E may represent are hydrogen, chloro, bromo, fluoro, nitro, cyano or trifluoromethyl.

Examples of substitiuents which M may represent are cyano, —SO$_2$F, chloro, bromo, fluoro, —SO$_3$H, —SO$_3^-$Li$^+$, —SO$_3^-$Na$^+$,

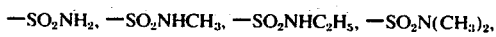

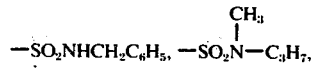

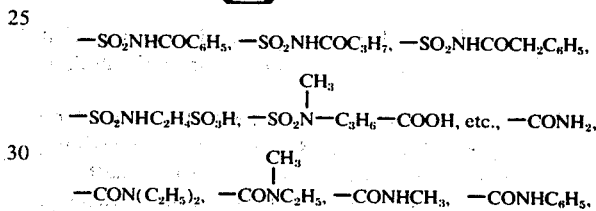

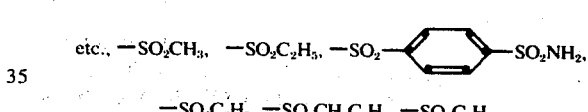

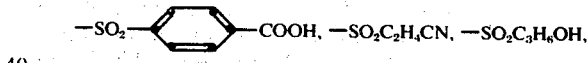

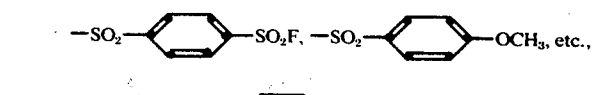

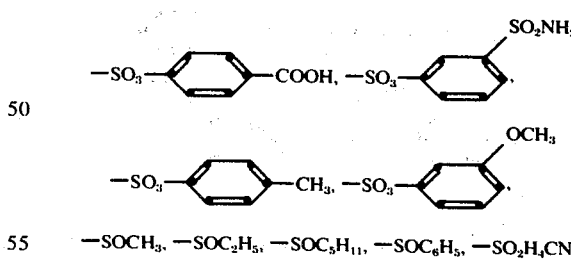

—SOCH$_3$, —SOC$_2$H$_5$, —SOC$_5$H$_{11}$, —SOC$_6$H$_5$, —SO$_2$H$_4$CN, —SOC$_2$H$_4$OH, —SOC$_3$H$_6$COOH, SOC$_3$H$_7$, etc.

Preferred compounds are those having Formulas I, II and III above wherein

R$^2$ represents an alkylene radical having 1 to about 4 carbon atoms, phenylene or phenylene substituted with carboxy, chloro, methyl or methoxy;

L represents sulfamoyl, sulfonamido, carbamoyl or carboxamido;

R represents hydrogen;

q is an integer having a value of 1;

m is an integer having a value of 0 or 1;

Q represents hydroxy, —NHCOR³ or —NHSO₂R³ wherein R³ represents an alkyl radical having 1 to about 4 carbon atoms, an alkyl radical having 1 to about 4 carbon atoms substituted with hydroxy, cyano, sulfamoyl, carboxy or sulfo; benzyl, phenyl or phenyl substituted with carboxy, chloro, methyl, methoxy or sulfamoyl;

D represents chloro, fluoro, bromo, cyano, trifluoromethyl, nitro, fluorosulfonyl, trifluoromethylsulfonyl, alkylsulfonyl having 1 to about 6 carbon atoms, alkysulfonyl having 1 to about 6 carbon atoms substituted with hydroxy, chloro, phenyl, cyano, sulfamoyl, carboxy, or sulfo; phenylsulfonyl; phenylsulfonyl substituted with hydroxy, sulfamoyl, fluorosulfonyl, carboxy or sulfo; a sulfamoyl radical having the formula —SO₂NHR⁶ wherein R⁶ is hydrogen, an alkyl radical having 1 to about 4 carbon atoms, or an alkyl radical having 1 to about 4 carbon atoms substituted with hydroxy, cyano, sulfamoyl, carboxy or sulfo; benzyl, phenyl or phenyl substituted with hydroxy, sulfonyl, sulfamoyl, carboxy or sulfo;

a carbamoyl radical having the formula —CON(R⁵)₂ wherein R⁵ is hydrogen or methyl, and E represents hydrogen, fluoro, or chloro; and M represents sulfo, cyano, chloro, an alkylsulfonyl radical having 1 to about 8 carbon atoms, benzylsulfonyl, an alkylsulfinyl radical having 1 to about 4 carbon atoms, —CON(CH₃)₂, a sulfamoyl radical of the formula —SO₂NHR⁶ wherein R⁶ is hydrogen, an alkyl radical of 1 to about 4 carbon atoms; an alkyl radical having 1 to about 6 carbon atoms substituted with hydroxy, cyano, sulfamoyl, carboxy, or sulfo; benzyl, phenyl or phenyl substituted with hydroxy, sulfamoyl, carboxy or sulfo.

Especially preferred compounds are those having Formulas I, II and III above wherein R² represents an alkylene radical having 1 to about 4 carbon atoms or phenylene;

L represents sulfamoyl or sulfonamido;

J represents sulfonyl;

Q represents hydroxy, —NHSO₂R³ or —NHCOCH₃;

G represents hydroxy or a hydrolyzable acyloxy group having the formula:

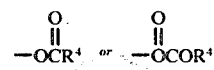

wherein

R⁴ is an alkyl radical having 1 to about 18 carbon atoms, phenyl or phenyl substituted with chloro or nitro;

D represents chloro, bromo, cyano, trifluoromethyl, trifluoromethylsulfonyl, nitro, alkylsulfonyl having 1 to about 6 carbon atoms, or benzylsulfonyl;

E represents hydrogen; and

M represents chloro, methylsulfinyl, —SO₂NHR⁶ wherein R⁶ is an alkyl group having 1 to about 4 carbon atoms, or —CON(CH₃)₂.

Even more preferred are the above compounds wherein X represents

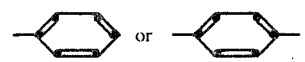

J represents sulfonyl;

G represents hydroxy; and

D represents an alkylsulfonyl radical having 1 to about 4 carbon atoms.

Especially preferred compounds are those having Formulas I, II and III above wherein Car- represents a radical of the formula:

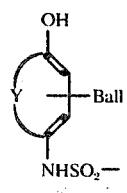

IV.

wherein Ball represents an organic ballasting group of such size and configuration as to render the compound nondiffusible during development in the alkaline processing composition and Y represents the carbon atoms necessary to complete a benzene or naphthalene nucleus including substituted benzene or naphthalene. When Y represents the atoms necessary to complete a naphthalene nucleus, Ball can be attached to either ring thereof. Examples of some preferred carriers are as follows:

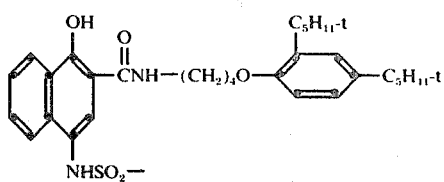

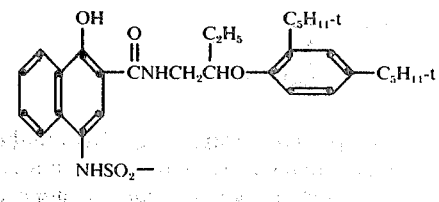

-continued
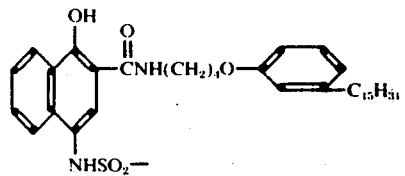
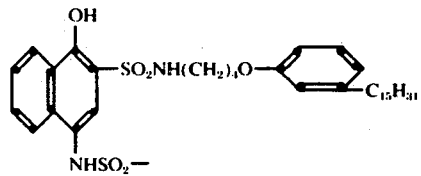
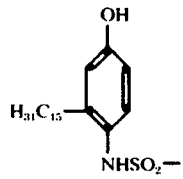
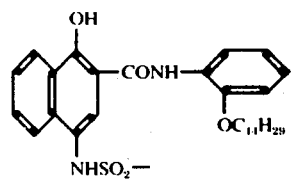
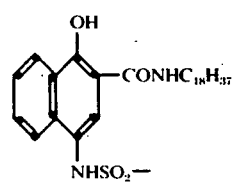
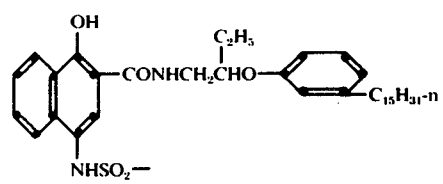
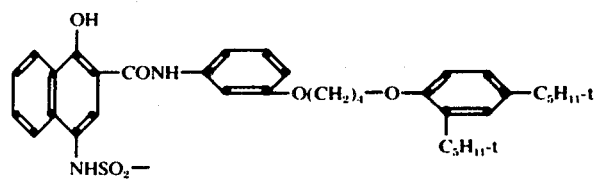
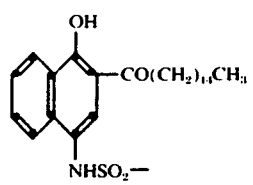
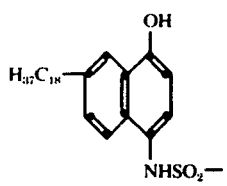
The nature of the ballast group (Ball) in the Formula IV for the compounds described above is not critical as long as it confers nondiffusibility to the compounds. Typical ballast groups include long straight or branched chain alkyl radicals linked directly or indirectly to the compound as well as aromatic radicals of the benzene and naphthalene series indirectly attached or fused directly to the benzene nucleus, etc. Useful ballast groups generally have at least 8 carbon atoms such as a substituted or unsubstituted alkyl group of 8 to 22 carbon atoms, an amide radical having 8 to 30 carbon atoms, a keto radical having 8 to 30 carbon atoms, etc., and may even comprise a polymer backbone. As previously indicated, preferred compounds are those wherein the ballast is attached to the benzene nucleus through a carbamoyl radical (—NHCO—) or a sulfamoyl radical (—SO$_2$NH—) in which the nitrogen is attached to the ballast group.

In addition to the ballast, the benzene nucleus in the above formula may have groups or atoms attached thereto such as the halogens, alkyl, aryl, alkoxy, aryloxy, nitro, amino, alkylamino, arylamino, amido, cyano, alkylmercapto, keto, carboalkoxy, heterocyclic groups, etc.

In a preferred embodiment of this invention CAR is a moiety which as a function of oxidation under alkaline conditions, releases a diffusible dye.

The preferred cyan dyes which are released from the carrier moieties as a function of oxidation under alkaline conditions may be represented by the following formulas:

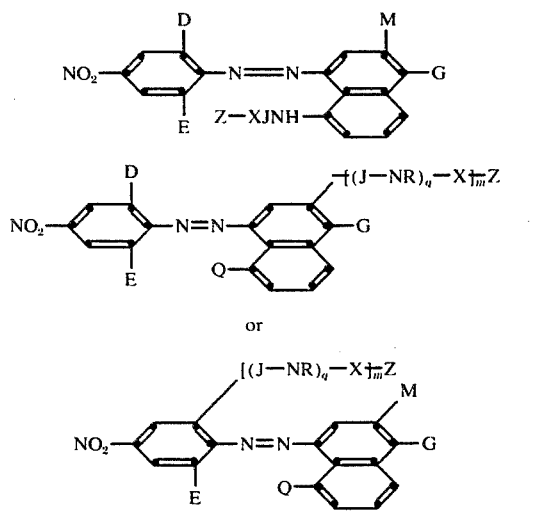

wherein

Z represents NH$_2$SO$_2$—, HSO$_2$— or lower alkyl—NH—; and

X, R, J, q, m, Q, G, M, D and E are as described previously, except that the Car substituents described for D are replaced by Z. The preferred released dyes, of course, correspond to the above mentioned preferred image dye-providing compounds set forth above.

When Z represents -SO$_2$H, the dyes thus represented may be released by the reactions described in Bloom, U.S. Pat. No. 3,443,940, in Puschel, U.S. Pat. No. 3,628,952 and Gompf, U.S. Pat. No. 3,698,897. When Z represents lower alkyl—NH— (i.e., an alkyl group having 1 to about 4 carbon atoms), the dyes thus represented may be released by the reactions described in Hinshaw et al., U.S. Ser. No. 326,628. The especially preferred released dyes of our invention are those represented by Formulas V, VI and VII above when Z represents —SO$_2$NH$_2$. These dyes may be released by the reactions described in Fleckenstein et al, U.S. Ser. No. 351,673 from the carrier moieties described by Formula IV.

A suitable process for producing a photographic transfer image in color using the compounds of our invention, for example those wherein Car is as shown in formula III, comprises the steps of:

1. treating the above-described photosensitive element with an alkaline processing composition in the presence of a silver halide developing agent to effect development of each of the exposed silver halide emulsion layers, thereby oxidizing the developing agent and the oxidized developing agent in turn cross-oxidizing the sulfonamido compound;

2. forming an imagewise distribution of diffusible released dye as a function of the imagewise exposure of each of the silver halide emulsion layers by cleaving each cross-oxidized sulfonamido compound; and 3. diffusing to a dye image-receiving layer at least a portion of each of the imagewise distributions of diffusible released dye to provide an image.

The photosensitive element in the above-described process can be treated with an alkaline processing composition to effect or initiate development in any manner. A preferred method for applying processing composition is by use of a rupturable container or pod which contains the composition. In general, the processing composition employed in our system contains the developing agent for development, although the composition could also just be an alkaline solution where the developer is incorporated in the photosensitive element, in which case the alkaline solution serves to activate the incorporated developer.

A photographic film unit according to our invention which is adapted to be processed by passing the unit between a pair of juxtaposed pressure-applying members, comprises:

1. a photosensitive element as described above;
2. a dye image-receiving layer; and
3. means for discharging an alkaline processing composition within the film unit such as a rupturable container which is adapted to be positioned during processing of the film unit so that a compressive force applied to the container by the pressure-applying members will effect a discharge of the contents of the container within the film unit;

the film unit containing a silver halide developing agent.

The dye image-receiving layer in the above-described film unit can be located on a separate support adapted to be superposed on the photosensitive element after exposure thereof. Such image-receiving elements are generally disclosed, for example, in U.S. Pat. No. 3,362,819. When the means for discharging the processing composition is a rupturable container, typically it is positioned in relation to the photosensitive element and the image-receiving element so that a compressive force applied to the container by pressure-applying members, such as found in a camera designed for in-camera processing, will effect a discharge of the contents of the container between the image-receiving element and the outermost layer of the photosensitive element. After processing, the dye image-receiving element is separated from the photo-sensitive element.

The dye image-receiving layer in the above-described film unit can also be located integral with the photosensitive silver halide emulsion layer. One useful format for integral receiver-negative photosensitive elements is disclosed in Belgian Pat. No. 757,960. In such an embodiment, the support for the photosensitive element is transparent and is coated with an image-receiving layer, a substantially opaque light reflective layer, e.g., $TiO_2$, and then the photosensitive layer of layers described above. After exposure of the photosensitive element, a rupturable container containing an alkaline processing composition and an opaque process sheet are brought into superimposed position. Pressure-applying members in the camera rupture the container and spread processng composition over the photosensitive element as the film unit is withdrawn from the camera. The processng composition develops each exposed silver halide emulsion layer and dye images are formed as a function of development which diffuse to the image-receiving layer to provide a position, right-reading image which is viewed through the transparent support on the opaque reflecting layer background.

Another format for integral negative-receiver photosensitive elements in which the present invention can be employed is disclosed in Belgian Pat. No. 757,959. In this embodiment, the support for the photosensitive element is transparent and is coated with the image-receiving layer, a substantially opaque, light-reflective layer and the photosensitive layer or layers described above. A rupturable container containing an alkaline processing composition and an opacifier is positioned adjacent to the top layer and a transparent top sheet. The film unit is placed in a camera, exposed through the transparent top sheet and then passes through a pair of pressure-applying members in the camera as it is being removed therefrom. The pressure-applying members rupture the container and spread processing composition and opacifier over the negative portion of the film unit to render it light insensitive. The processing composition develops each silver halide layer and dye images are formed as a result of development which diffuse to the image-receiving layer to provide a right-reading image that is viewed through the transparent support on the opaque reflecting layer background.

Still other useful integral formats in which the sulfonamido compounds can be employed are described in U.S. Pat. Nos. 3,415,644; 3,415,645; 3,415,646; 3,647,437; and 3,635,707.

The film unit or assembly of the present invention can be used to produce positive images in single or multicolors. In a three-color system, each silver halide emulsion layer of the film assembly will have associated therewith an image dye-providing material possessing a predominant spectral absorption within the region of the visible spectrum to which said silver halide emulsion is sensitive, i.e., the blue-sensitive silver halide emulsion layer will have a yellow image dye-providing material associated therewith, the green-sensitive silver halide emulsion layer will have a magenta image dye-providing material associated therewith, and the red-sensitive silver halide emulsion layer will have a cyan image dye-providing material associated therewith. The image dye-providing material associated with each silver halide emulsion layer can be contained either in the silver halide emulsion layer itself or in a layer contiguous to the silver halide emulsion layer. The cyan image dye-providing material will, of course, be a compound of this invention.

When G is a hydrolyzable acyloxy group, the absorption spectrum of the azo dye is shifted to shorter wavelength. "Shifted dyes" of this type absorb light outside the range to which the associated silver halide layer is sensitive. The use of certain related shifted azo dye developers is described in U.S. Pat. No. 3,307,947 issued Mar. 7, 1967. The shifted dye-providing materials of this invention can be advantageously contained in the silver halide emulsion layer without substantially reducing the sensitivity of the layer. The acyloxy group is hydrolyzed by the alkaline processing composition, releasing the cyan dye of the desired hue. The yellow and cyan image dye-providing materials can be selected from a variety of materials such as those compounds described by Fleckenstein et al U.S. Ser. No. 351,673, mentioned previously. Additional useful magenta image dye-providing materials are described in U.S. Pat. No. 3,954,476.

The concentration of the compounds, which preferably are alkali-cleavable upon oxidation, that are employed in the present invention can be varied over a wide range depending upon the particular compound employed and the results which are desired. For example, the image dye-providing compounds of the present invention can be coated in layers as dispersions in a hydrophilic film-forming natural or synthetic polymer, such as gelatin, polyvinyl alcohol, etc., which is adapted to be permeated by aqueous alkaline processing composition. Preferably, the ratio of dye-providing compound to polymer will be about 0.25 to about 4.0. The present compounds may then be incorporated in a gelatin by techniques known in the art (e.g., a high boiling, water immiscible organic solvent or a low boiling or water miscible organic solvent).

A variety of silver halide developing agents can be employed in our invention. Any silver halide developing agent can be used as long as it cross-oxidizes with the image dye-providing compounds used herein. The developer can be employed in the photosensitive element to be activated by the alkaline processing composition. Specific examples of developers which can be employed in our invention include hydroquinone, aminophenols, e.g., N-methylaminophenol, Phenidone (1-phenyl-3-pyrazolidone) trademark of Ilford, Ltd.; Dimezone (1-phenyl-4,4-dimethyl-3-pyrazolidone) trademark of Eastman Kodak Company; 1-phenyl-4-methyl-4-hydroxymethyl-3-pyrazolidone, N,N-diethyl-p-phenylenediamine, 3-methyl-N,N-diethyl-p-phenylenediamine, 3-methoxy-N,N-diethyl-p-phenylenediamine, etc. The black-and-white developers in this list are preferred, in that they have a reduced propensity of staining the dye image-receiving layer.

In a preferred embodiment of our invention, the silver halide developer in our process becomes oxidized upon development and reduces silver halide to silver metal. The oxidized developer then cross-oxidizes the sulfonamido-phenol or sulfonamido-naphthol dye-releasing compound. The product of cross-oxidation then undergoes alkaline hydrolysis, thus releasing an imagewise distribution of diffusible anionic dye which then diffuses to the receiving layer to provide the dye image. The diffusible moiety is transferable in alkaline processing composition either by virtue of its self-diffusivity or by having attached to it one or more solubilizing groups such as —COOH, —$SO_3H$, —$SO_2NR^5R^6$, OH, etc. (where $R^5$ and $R^6$ are as described previously with at least one being hydrogen).

In using the especially preferred dye-releasing compounds according to our invention, the production of diffusible dye images is a function of development of the silver halide emulsions with a silver halide developing agent to form either negative or direct positive silver images in the emulsion layers. If the silver halide emulsion employed forms a direct positive silver image, such as a direct positive internal-image emulsion or a solarizing emulsion, which develops in unexposed areas, a positive image can be obtained on the dye image-receiving layer. After exposure of the film unit, the alkaline processing composition permeates the various layers to initiate development in the unexposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction in a preferred embodiment of our invention, to release the preformed dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit lowers the pH of the film unit (or the image-receiving unit) to stabilize the image.

Internal-image silver halide emulsions useful in those embodiments wherein a dye is released as a function of oxidation are direct-positive emulsions that form latent images predominantly inside the silver halide grains, as distinguished from silver halide grains that form latent images predominantly on the surface thereof. Such internal-image emulsions are described by Davey et al in U.S. Pat. No. 2,592,250, issued Apr. 8, 1952, and elsewhere in the literature. Other useful emulsions are described in U.S. Pat. No. 3,761,276, dated Sept. 25, 1973. Internal-image silver halide emulsions can be defined in terms of the increased maximum density obtained when developed with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 and developing for 3 minutes at 2° C. in Developer A below (internal-type developer), have a maximum density at least five times the maximum density obtained when an equally exposed silver halide emulsion is developed for 4 minutes at 20° C. in Developer B described below (surface-type developer). Preferably, the maximum density in Developer A is at least 0.5 density unit greater than the maximum density in Developer B.

| DEVELOPER A | |
|---|---|
| Hydroquinone | 15 g. |
| Monomethyl-p-aminophenol sulfate | 15 g. |
| Sodium sulfite (desiccated) | 50 g. |
| Potassium bromide | 10 g. |
| Sodium hydroxide | 25 g. |
| Sodium thiosulfate | 20 g. |
| Water to make one liter. | |
| DEVELOPER B | |
| P-hydroxyphenylglycine | 10 g. |
| Sodium carbonate | 100 g. |
| Water to make one liter. | |

The internal-image silver halide emulsions when processed in the presence of fogging or nucleating agents provide direct positive silver images. Such emulsions are particularly useful in the above-described embodiment. Suitable fogging agents include the hydrazines disclosed in Ives U.S. Pat. Nos. 2,588,982 issued Mar. 11, 1952, and 2,563,785 issued Aug. 7, 1951; the hydrazides and hydrazones disclosed in Whitmore U.S. Pat. No. 3,227,552 issued Jan. 4, 1966; hydrazone quaternary salts described in Lincoln and Heseltine U.S. Pat. No. 3,615,615 issued Oct. 26, 1971; hydrazone containing polymethine dyes described in Spence and Janssen U.S. Pat. No. 3,718,470 issued Feb. 27, 1973; or mixtures thereof. The quantity of fogging agent employed can be widely varied depending upon the results desired. Generally, the concentration of fogging agent is from about 0.4 to about 8 grams per mole of silver in the photosensitive layer in the photosensitive element or from about 0.1 to about 2 grams per liter of developer if it is located in the developer. The fogging agents described in U.S. Pat. Nos. 3,615,615 and 3,718,470, however, are preferably used in concentrations of about 0.5 to 10.0 grams per mole of silver in the photosensitive layer.

The solarizing direct-positive silver halide emulsions useful in the above-described embodiment are well-known silver halide emulsions which have been effectively fogged either chemically, such as by the use of reducing agents, or by radiation to a point which corresponds approximately to the maximum density of the reversal curve as shown by Mees, *The Theory of the Photographic Process*, published by the Macmillan Co., New York, New York, 1942, pages 261–297. Typical methods for the preparation of solarizing emulsions are shown by Groves British Pat. No. 443,245, Feb. 25, 1936, who subjected emulsions to Roentgen rays "until an emulsion layer formed therefrom, when developed without preliminary exposure, is blackened up to the apex of its graduation curve"; Szaz Bristish Pat. No. 462,730, Mar. 15, 1937, the use of either light or chemicals such as silver nitrate, to convert ordinary silver halide emulsions to solarizing direct positive emulsions; and Arens U.S. Pat. No. 2,005,837, June 25, 1935, the use of silver nitrate and other compounds in conjunction with heat to effect solarization. Particularly useful are the fogged direct-positive emulsions of Berriman U.S. Pat. No. 3,367,778; Illingsworth U.S. Pat. Nos. 3,501,305, 3,501,306 and 3,501,307; and combinations thereof.

Other embodiments in which our imaging chemistry can be employed include the techniques described in U.S. Pat. Nos. 3,227,550, 3,227,551, 3,227,552 and 3,364,022.

If photographic elements are used which contain compounds of this invention wherein Car is a silver halide developer as described, for example, in U.S. Pat. No. 2,983,606, when the liquid processing composition is applied, it permeates the emulsion to provide a solution of the dye developer substantially uniformly distributed in the emulsion. As the exposed silver halide emulsion is developed to a negative silver image, the oxidation product of the dye developer is immobilized or precipitated in situ with the developed silver, thereby providing an imagewise distribution of unoxidized dye developer dissolved in the liquid processing composition. This immobilization is apparently due, at least in part, to a change in the solubility characteristics of the dye developer upon oxidation. At least part of this imagewise distribution of unoxidized dye-developer is transferred to a superimposed image-receiving layer to provide a transfer image.

Negative silver halide emulsions useful in certain embodiments of this invention, such as the above, can comprise, for example, silver chloride, silver bromide, silver chlorobromide, silver bromoiodide, silver chlorobromiodide or mixtures thereof. The emulsions can be coarse- or fine-grain and can be prepared by any of the well-known procedures, e.g., single-jet emulsions such as those described in Trivelli and Smith, *The Photographic Journal*, Vol. LXXIX, May, 1939 (pp. 330–338), double-jet emulsions, such as Lippmann emulsions, ammoniacal emulsions, thiocyanate or thioether ripened emulsions such as those described in Nietz et al U.S. Pat. No. 2,222,264 issued Nov. 19, 1940; Illingsworth U.S. Pat. No. 3,320,069 issued May 16, 1967; and Jones U.S. Pat. No. 3,574,628 issued Apr. 13, 1971. The emulsions may be monodispersed regular-grain emulsions such as the type described in Klein and Moisar, *J. Phot. Sci.*, Vol. 12, No. 5, Sept./Oct., 1964 (pp. 242–251).

Another embodiment of our invention uses the image-reversing technique disclosed in British Pat. No. 904,364, page 19, lines 1–41. In this system our dye-providing compounds are used in combination with physical development nuclei in a nuclei layer contiguous to the photosensitive silver halide negative emulsion layer. The film unit contains a silver halide solvent, preferably in a rupturable container with the alkaline processing composition.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectivity sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181; 2,643,886; 2,653,732; 2,724,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color film unit according to this invention, each silver halide emulsion layer containing a dye image-providing material or having the dye image-providing material present in a contiguous layer may be separated from the other silver halide emulsion layers in the image-forming portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104; 3,043,692; 3,044,873; 3,061,428; 3,069,263; 3,069,264; 3,121,011; and 3,427,158.

Generally speaking, except where noted otherwise, the silver halide emulsion layers in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., gelatin, are about 1 to 5 microns in thickness. Of course, these thicknesses are approximate only and can be modified according to the product desired.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described in Minsk U.S. Pat. No. 2,882,156, issued Apr. 14, 1959, and basic polymeric mordants such as described in Cohen et al U.S. Pat. No. 3,625,694, issued Dec. 7, 1971; U.S. Pat. No. 3,709,690, issued Jan. 9, 1973; and U.S. Pat. No. 3,898,088, issued Aug. 5, 1975. See also U.S. Pat. No. 3,898,088, issued Aug. 5, 1975.

Preferred mordants are cationic mordants such as polymeric compounds composed of a polymer having quaternary nitrogen groups and at least two aromatic nuclei for each quaternary nitrogen in the polymer cation (i.e., having at least two aromatic nuclei for each positively charged nitrogen atom), such polymeric compounds being substantially free of carboxy groups. Useful mordants of this type are comprised of units of the following formula in copolymerized relationship with units of at least one other ethylenically unsaturated monomer:

$$\begin{array}{c} R^7 \\ | \\ CH-C \\ | \quad | \\ R^8 \quad (Q) \\ | \\ R^{11}-N^+-R^9 \quad X^- \\ | \\ R^{10} \end{array}$$

wherein $R^7$ and $R^8$ each represent a hydrogen atom or a lower alkyl radical (of 1 to about 6 carbon atoms) and $R^8$ can additionally be a group containing at least one aromatic nucleus (e.g., phenyl, naphthyl, totyl); Q can be a divalent alkylene radical (of 1 to about 6 carbon atoms), a divalent arylene radical, a divalent aralkylene radical, a divalent arylenealkylene radical, such as

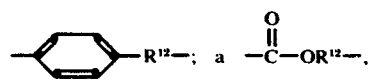

-continued

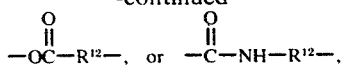

wherein R¹² is an alkylene radical, or R⁸ can be taken together with Q to form a

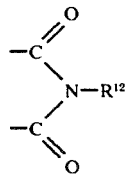

group; R⁹, R¹⁰ and R¹¹ can be alkyl, aralkyl or aryl, or R⁹ and R¹⁰ and the nitrogen atom to which they are attached can together with Q represent the atoms and bonds necessary to form a quaternized nitrogen-containing heterocyclic ring, and X⁻ is a monovalent negative salt-forming radical or atom in ionic relationship with the positive salt-forming radical, wherein said polymer is substantially free of caboxy groups and wherein the positive salt forming radical of said polymer comprises at least two aryl groups for each quaternary nitrogen atom in said polymer. In one preferred embodiment, Q represents a phenylene or substituted phenylene radical and R⁹, R¹⁰ and R¹¹ are the same or different and represent alkyl groups, the sum of their carbon atoms exceeding 12. These preferred polymeric cationic mordants are described further in the above-mentioned U.S. Pat. No. 3,709,690 and U.S. Application Ser. No. 400,778, incorporated herein by reference.

Other mordants in our invention include poly-4-vinyl-pyridine, the 2-vinyl pyridine polymer methyl-p-toluene sulfonate and similar compounds described in Sprague et al U.S. Pat. No. 2,484,430, issued Oct. 11, 1949, and cetyl trimethylammonium bromide, etc. Effective mordanting compositions are also described in Whitmore U.S. Pat. No. 3,271,148 and Bush U.S. Pat. No. 3,271,147, both issued Sept. 6, 1966.

Generally, good results are obtained when the image-receiving layer, preferably alkaline solution-permeable, is transparent and about 0.25 to about 0.40 mil in thickness. This thickness, of course, can be modified depending upon the result desired. The image-receiving layer can also contain ultraviolet absorbing materials to protect the mordanted dye images from fading due to ultraviolet light, brightening agents such as the stilbenes, coumarins, triazines oxazoles, dye stabilizers such as the chromanols, alkylphenols, etc.

Use of a pH-lowering material in the dye image-receiving element of a film unit according to the invention will usually increase the stability of the transferred image. Generally, the pH-lowering material will effect a reduction in the pH of the image layer from about 13 or 14 to at least 11 and preferably 4–8 within a short time after imbibition. For example, polymeric acids as disclosed in U.S. Pat. No. 3,362,819, or solid acids or metallic salts, e.g., zinc acetate, zinc sulfate, magnesium acetate, etc., as disclosed in U.S. Pat. No. 2,584,030 may be employed with good results. Such pH-lowering materials reduce the pH of the film unit after development to terminate development and substantially reduce further dye transfer and thus stabilize the dye image.

An inert timing or spacer layer can be employed in the practice of our invention over the pH-lowering layer which "times" or controls the pH reduction as a function of the rate at which alkali diffuses through the inert spacer layer. Examples of such timing layers include gelatin, polyvinyl alcohol or any of those disclosed in U.S. Pat. No. 3,455,686. The timing layer may be effective in evening out the various reaction rates over a wide range of temperatures, e.g., premature pH reduction is prevented when imbibition is effected at temperatures above room temperature, for example, at 95° –100° F. The timing layer is usually about 0.1 to about 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc.

The alkaline processing composition employed in this invention is the conventional aqueous solution of an alkaline material, e.g., sodium hydroxide, sodium carbonate or an amine such as diethylamine, preferably processing a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cp. to about 200,000 cp. In certain embodiments of our invention, an opacifying agent, e.g., TiO₂, carbon black, pH indicator dyes, etc., may be added to the processing composition.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge.

The alkaline solution-permeable, substantially opaque, light-reflective layer employed in certain embodiments of photographic film units of our invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layer, dark-colored opacifying agents, e.g., carbon black, nigrosine dyes, etc., may be added to it, or coated in a separate layer adjacent to the light-reflective layer.

The supports for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film, poly(ethyleneterephthalate) film, polycarbonate film, poly-α-olefins such as polyethylene and polypropylene film, and related films or resinous materials. The support can be from about 2 to about 9 mils in thickness.

The silver halide emulsions useful in our invention are well known to those skilled in the art and are described in *Product Licensing Index*, Vol. 92, December, 1971, publication 9232, p. 107, paragraph I, "Emulsion types"; they may be chemically and spectrally sensitized as described on page 107, paragraph III, "Chemical sensitization", and pp. 108–109, paragraph XV, "Spectral sensitization", of the above article; they can be protected against the production of fog and can be stabilized against loss of sensitivity during keeping by employing the materials described on p. 107, paragraph V, "Antifoggants and stabilizers", of the above article; they can contain development modifiers, hardeners, and coating aids as described on pp. 107–108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on p. 108, paragraph XI, "Plasticizers and lubricants", and paragraph VIII, "Vehicles", and p. 109, paragraph XVI, "Absorbing and filter dyes", of the above article; they and other layers in the photographic elements used in this invention may contain addenda which are incorporated by using the procedures described on p. 109, paragraph XVII, "Methods of addition", of the above article; and they can be coated by using the various techniques described on p. 109, paragraph XVIII, "Coating procedures", of the above article, the disclosures of which are hereby incorporated by reference.

It will be appreciated that there remains in the photographic element after transfer has taken place in imagewise distribution of dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. The imagewise distribution of dye may also diffuse out of the element into these baths, if desired, rather than to an image-receiving element. If a negative-working silver halide emulsion is employed in such photosensitive element, then a positive color image, such as a color transparency or motion-picture film, may be produced in this manner. If a direct-positive silver halide emulsion is employed in such photosensitive element, then a negative color image may be produced.

Preferably, when the desired dye image is retained in the image-forming unit, the image dye-providing materials are shifted (G is hydrolyzable acyloxy) and are incorporated in the silver halide emulsion layer. Improved processes are described in U.S. Pat. No. 3,923,510, issued Dec. 2, 1975.

The following examples are provided for a further understanding of the invention. The structures of all of the compounds were confirmed by their infrared and NMR spectra and in some cases by elemental analysis. The notation —$C_5H_{11}$—t as used herein is an abbreviation for t-pentyl.

4-Amino-N-[4-(2,4-di-t-pentylphenoxy)-butyl]-1-hydroxy-2-naphthamide may be prepared as follows: 1-hydroxy-N-[4-(2,4-di-t-pentylphenoxy)-butyl]-2-napthamide (U.S. Pat. No. 2,474,293) is coupled with a diazotized p-anisidine

The azo group of the compound thus prepared may then be reduced with sodium dithionite ($Na_2S_2O_4$) to the corresponding amine (see also U.S. Pat. No. 3,458,315, column 10).

EXAMPLE 1

Preparation of DRR Compound

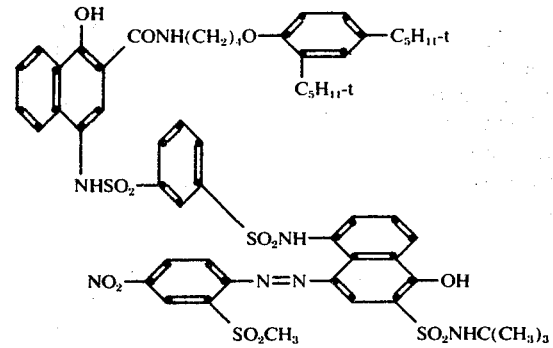

To a slurry of 5.0 g. (0.06 mole) of sodium bicarbonate in 60 ml. of dimethylsulfoxide was added at 90° C. under nitrogen 11.15 g. (0.015 mole) of 2-t-butylsulfamoyl-5-(3-fluorosulfonylphenylsulfonamido)-4-(2-methanesulfonyl-4-nitrophenylazo)-1-naphthol and 7.6 g. (0.0155 mole) of 4-amino-N-[4-(2,4-di-t-pentylphenoxy)butyl]-1-hydroxy-2-naphthamide (U.S. Pat. No. 3,458,315). When after 15 minutes at 90° C. no reaction was observed, and additional 5.0 g. (0.06 mole) of sodium bicarbonate was added. The mixture was heated an additional 30 minutes and then cooled to 25° C. The solid was collected on a filter funnel, and the filtrates poured into 400 ml. of ice water containing 30 ml. of concentrated hydrochloric acid. The precipitated solid was collected on a filter funnel, washed with water and dried under vacuum. The solid was then dissolved in 1250 ml. of chloroform and magnesium sulfate drying agent was added. After stirring for one hour, the solid was collected on a filter funnel, the filtrates concentrated to 350 ml. and then diluted to 2 liters with hexane. The solid was collected on a filter funnel and dried to yield 16.4 g. (98%). The solid was then recrystallized from 125 ml. of acetic acid, slurried with cyclohexane, and dried to yield 12.8 g. (75%), m.p. 186°–90° C. dec.

Preparation of Intermediates a. The 2-t-butylsulfamoyl-5-(3-fluorosulfonylbenzenesulfonamido)-4-(2-methylsulfonyl-4-nitrophenylazo)-1-naphthol was prepared by diazo coupling. 7.6 G. (0.11 mol) of sodium nitrite was added to 66 ml. of sulfuric acid at 5° C. and warmed to 70° C. to effect solution. After cooling to 25° C., 23.8 g. (0.11 mol) of 2-methanesulfonyl-4-nitroaniline was added, and the mixture stirred for 2 hours. The diazonium salt mixture was poured into 250 ml. of 1:5 acid (1 part propionic acid to 5 parts acetic acid) at 5° C. A solution of the coupler was prepared by dissolving 51.6 g. (0.1 mol) of 2-t-butylsulfamoyl-5-(3-fluorosulfonylbenzenesulfonamido)-1-naphthol in 66 ml. of pyridine, cooling to 10° C., and adding 520 ml. of the 1:5 acid at 30° C. The diazonium mixture was added to the coupler solution and stirred for one hour at 7° C., the solid collected on a filter funnel and then slurried twice in 500 ml. of 1% hydrochloric acid. The slurry was filtered and the solid dried in a desiccator at 60° C. to yield 25.8 g. of dye. The filtrates from the reaction mixture were diluted to 8000 ml. with water to precipitate additional dye, which was collected on a filter funnel and dried in a desiccator to yield an additional 40 g. (88% total).

b. Preparation of 2-t-Butylsulfamoyl-5-(3-fluorosulfonylbenzenesulfonamido)-1-naphthol. To a solution of 25.85 g. (0.1 mol) of 3-fluorosulfonylbenzenesulfonyl chloride and 9.5 g. (0.12 mol) of dry pyridine in 1000 ml. of chloroform, under nitrogen, was added 29.3 g. (0.1 mol) of 5-amino-2-t-butylsulfamoyl-1-naphthol. The solution was stirred for 4 hours, and an additional 13.0 g. (0.05 mol) of 3-fluorosulfonylbenzenesulfonyl chloride and 4.0 g. (0.05 mol) of dry pyridine was added. The solution was stirred for another hour and extracted five times with 500 ml. of 10% hydrochloric acid. The chloroform layer was dried with magnesium sulfate and poured into 6 liters of hexane. The solid was collected on a filter funnel and dried to yield 46.0 g. (89%).

c. Preparation of 5-amino-2-t-butylsulfamoyl-naphthol. 50 g. (0.146 mol) of 5-acetamido-1-acetoxy-2-naphthalenesulfonyl chloride is dissolved in 600 ml. of anhydrous tetrahydrofuran, treated with decolorizing carbon and filtered. To this solution is added 50 ml. of t-butylamine in one portion. The mixture is stirred for one hour at room temperature, then filtered to remove any precipitated t-butyl-amine hydrochloride and concentrated to dryness at 50°–60° C. under vacuum. The resulting solid is refluxed in 400 ml. of 10% sodium hydroxide solution for two hours, treated with decolorizing carbon, filtered hot, and then cooled to below 15° C. to precipitate 25 g. of 2-t-butyl-sulfamoyl-5-amino-1-naphthol sodium salt. This tan solid is dissolved in 500 ml. of cold water and carefully acidified with acetic acid bringing the pH between 7.0 and 6.5. The pink product is filtered off and dried under vacuum at 50°–60° C., yielding 20.7 g. (48.2%).

d. The 5-acetamido-1-acetoxy-2-naphthalenesulfonyl chloride was prepared by dropwise treatment of a suspension of dry sodium 5-acetamido-1-acetoxynaphthalene-2-sulfonate in 100 ml. phosphoryl chloride with 5.5 ml. dry dimethylformamide in a nitrogen atmosphere. The reaction mixture was stirred 1 hour and then poured over 600 ml. of crushed ice. The crude product was filtered and dissolved immediately in 500 ml. chloroform. The solution was treated with Norite and dried over anhyd. magnesium sulfate to give 10.8 g. (44%) of a resinous yellow product which showed a single spot on a thin-layer chromatography.

e. The sodium-5-acetamido-1-acetoxy-2-naphthalenesulfonate was prepared by acetylation of 5-amino-1-hydroxynaphthalene-2-sulfonic acid (30.0 g.) with 50 ml. acetic anhydride in 25 ml. pyridine, the mixture heated on the steam bath for 1.5 hours. The viscous, cooled solution was extracted twice with a total of 600 ml. benzene and then treated with 500 ml. of saturated aqueous sodium chloride. The resulting tan precipitate was filtered, washed with saturated sodium chloride and dried. The yield of 59 g. contained some sodium chloride.

f. The inner salt of 5-amino-1-hydroxy-naphthalene-2-sulfonic acid was obtained by sulfonation of 50 g. of purified 5-amino-1-naphthol in 100 g. sulfuric acid below 30° C. The mixture was stirred 1 hour at room temperature, then poured onto about 500 g. ice. The crude product ws filtered off, then purified first by dissolving in dilute sodium hydroxide solution and precipitating with acetic acid and, subsequently, by digesting the solid in 2 l. water containing 100 ml. acetic acid and cooling. The yield was 48 g. (70%).

The products from each step of the above synthesis were characterized for identity and/or purity by thin layer chromatography, infrared spectrum, and NMR spectrum in dimethylsulfoxide-$d_6$.

EXAMPLE 2

Preparation of DRR Compound 11

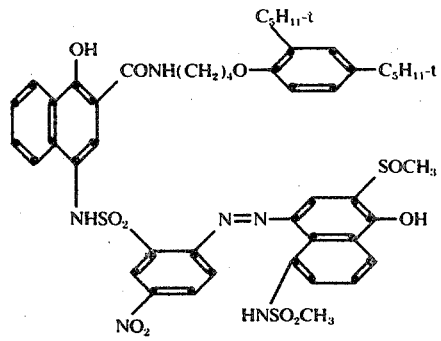

To 55 ml. dimethyl sulfoxide, heated and stirred in an oil bath at 90° C. was added successively under nitrogen 11.5 g. powdered sodium carbonte, 6.5 g. (0.012 mole) 4-(2-fluorosulfonyl-4-nitrophenylazo)-5-methanesulfonamido-2-methylsulfinyl-1-naphthol and 6.2 g. (0.013 mole) 4-amino-N-[4-(2,4-di-t-pentylphenoxy)butyl]-1-hydroxy-2-naphthamide. After the mixture was heated and stirred for 90 minutes, an additional 2 g. of sodium carbonate was added and the heating and stirring continued for 30 minutes. The cooled mixture was poured into 190 ml. 1:1 conc. hydrochloric acid/water. The resulting solid was filtered, washed with water and dried, yielding 14.4 g. crude product. This material was extracted with 350 ml. boiling acetonitrile which on cooling yielded 6.8 g. still impure dye. This material was dissolved in chloroform, diluted with a little benzene and slurried with a large quantity of grade 62 60200 mesh silica gel whereupon the dye precipitated. The mixture was filtered and washed with benzene, and the dye was removed by washing with chloroform and finally with 15% acetone in chloroform. The dye extracts were concentrated on a rotary evaporator and filtered and the precipitate washed with a little chloroform to give 3.3 g. of pure dye. The above extracts were evaporated to dryness and chromatographed on the same silica gel in chloroform solution. The eluents were evaporated in vac. and the residue crystallized from acetonitrile yielding 2.8 g., making a total of 6.1 g. (50%).

Preparation of Intermediates a. 4-(2-Fluorosulfonyl-4-nitrophenylazo)-5-methanesulfonamido-2-methylsulfinyl-1-naphthol. 4.4 g. (0.02 mole) 2-fluorosulfonyl-4-nitroaniline was added at room temperature to a solution of nitrosylsulfuric acid prepared from 1.38 g. sodium nitrite and 18 ml. conc. sulfuric acid. The mixture was stirred one hour, cooled to 10° C., and diluted to 40 ml. with a 1:4 propionic acid/acetic acid mixture, keeping the temperature below 10° C. This solution was added slowly with cooling below 15° C. to a stirred slurry of 5-methanesulfonamido-2-methylsulfinyl-1-naphthol in 100 ml. of a 1:4 propionic acid/acetic acid mixture containing 8% sodium acetate. After part of the addition, an additional 12 g. of sodium acetate suspended in 20 ml. of the above acid mixture was added portionwise during the remainder of the addition. The mixture was stirred 1½ hours and then filtered. The precipitate was washed thoroughly with water, pressed dry and then air dried. The crude product was purified by digesting it in boiling acetic acid and filtering hot. The remaining solid was washed with ethanol and air dried, yielding 6.5 g. (61%) of pure product.

b. 5-Methanesulfonamido-2-methylsulfinyl-1-naphthol. 10.0 g. (0.02 mole) ethyl-5-bis(methanesulfonyl)-amino-1-methanesulfonyloxynaphthalene-2-sulfinate was dissolved in 250 ml. refluxing tetrahydrofuran (distilled from LiAlH$_4$). The solution was cooled in an ice-water bath and 17.5 ml. (0.044 mole) 2.5N methyl magnesium bromide in ether was added. Bubbling the mixture occurred. The solution was stirred for ½ hour and then treated with dilute hydrochloric acid and diluted further with a large volume of water. The mixture was extracted with benzene and the extracts combined and washed with water until the washings gave a neutral pH test. The benzene solution was dried over anhydrous sodium sulfate and concentrated to a small volume. A precipitate was filtered off and the filtrate was taken to a gum on a rotary evaporator. The precipitate and residue were combined, 33 ml. 2.5N potassium hydroxide was added, and the mixture was heated on a steam bath for 1½ hours. The mixture was cooled, filtered and acidified to give a gum. The gum was washed with fresh water and upon standing it solidified. The solid was crushed, filtered off and washed with additional water. It was purified by digesting in hot ethanol and filtering while hot to give 3.9 g. (63% yield) of off-white product, m.p. 177°–8° dec.

c. Ethyl-5-bis(methanesulfonyl)amino-1-methanesulfonyloxynaphthalene-2-sulfonate. 20.0 g. of sodium 5-bis(methanesulfonyl)-amino-1-methanesulfonyloxynaphthalene-2-sulfinate was slurried in 100 ml. pyridine previously dried over molecular sieves. Dropwise 5.2 g. ethyl chloroformate was added, resulting in nearly complete solution. The mixture was stirred ½ hour and then an additional 0.6 g. ethyl chloroformate was added. After 15 minutes stirring a precipitate formed. The mixture was diluted with a large volume of water. The precipitate was washed with a little water, then a little dilute aqueous hydrochloric acid, and finally with more water and then air dried. The yield was 11.2 g. (55%).

d. Sodium 5-bis(methanesulfonyl)amino-1-methanesulfonyloxynaphthalene-2-sulfinate. 5-Bis(methanesulfonyl)amino-1-methanesulfonyloxy-2-naphthalenesulfonyl chloride (98 g., 0.2 mole) was added proportionwise over a 30 minute period to 400 ml. of an aqueous solution from 126 g. (1 mole) sodium sulfite (anhyd.) at 70° C. The mixture was stirred at 50°–60° C. for 5 hours, then overnight at room temperature. The precipitate was filtered off and vacuum dried at 45° C. to give a yield of crude salt of 123 g. It was purified by slurrying in hot methanol, the solution then cooled, concentrated and the solid collected and dried.

e. The 5-bis(methanesulfonyl)amino-1-methanesulfonyloxy-2-naphthalenesulfonyl chloride was prepared from 7.1 g. of a paste of the sodium 2-sulfonate analogue in 15 ml. N-methylpyrrolidinone, which was added to 50 ml. of phosphoryl chloride with stirring under nitrogen, cooled in an ice-water bath. The mixture was stirred cold for 20 minutes, then for 10 minutes at room temperature. The resulting paste was poured into 1.5 l. ice-water, the solid filtered and washed with dilute hydrochloric acid. The moist solid was dissolved in 400 ml. tetrahydrofuran, treated with activated charcoal, with anhyd. magnesium sulfate to dry it, and then later filtered. The volume of filtrate was reduced to 25 ml. in a rotary evaporator and diluted with hexane to precipitate 5.4 g. of the sulfonyl chloride, m.p. 240° dec.

f. The sodium 5-bis(methanesulfonyl)amino-1-methanesulfonyloxy-2-naphthalene sulfonate was prepared from 40 g. of the inner salt of 5-amino-1-hydroxy-2-naphthalenesulfonic acid by dissolving it in 100 ml. water and adjusting the pH to 7.5 with sodium hydroxide solution. Methanesulfonyl chloride (80 g.) was added dropwise over a 4 hour period, the mixture kept at 35°–45° and pH 6.5–7.5 by cooling and by periodic additions of sodium hydroxide solution. After stirring for 1 hour at room temperature (pH about 7), the mixture was filtered and the precipitate freed as much as possible from water. It was slurried in 200 ml. methanol, filtered, washed with ether and dried. Yield 78.5 g.

g. The inner salt of 5-amino-1-hydroxy-naphthalene-2-sulfonic acid was obtained by sulfonation of 50 g. of purified 5-amino-1-naphthol in 100 g. sulfuric acid below 30° C. The mixture was stirred 1 hour at room temperature, then poured onto about 500 g. ice. The crude product was filtered off, then purified first by dissolving in dilute sodium hydroxide solution and precipitating with acetic acid and, subsequently, by digesting the solid in 2 l. water containing 100 ml. acetic acid and cooling. The yield was 48 g. (70%).

The products from each step of the above synthesis were characterized for identity and/or purity by thin layer chromatography, infrared spectrum, and NMR spectrum in dimethylsulfoxide-d$_6$.

EXAMPLE 2a

Preparation of DRR Compound 12a

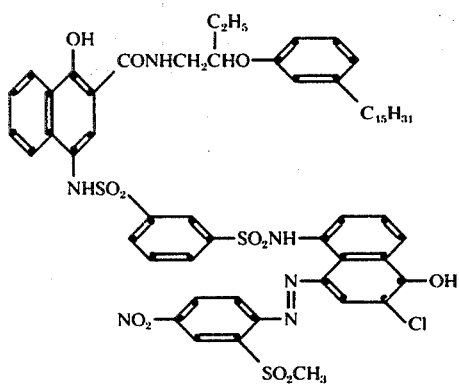

This dye-releasing redox compound is prepared by the reaction of the following azo dye Compound B and the following aminonaphthol Compound A according to the method described in Example 1. The compounds are, in turn, prepared as follows:

Compound A.

4-Amino-1-hydroxy-N-[2-(3-n-pentadecylphenoxy)-butyl]-2-naphthamide.

This compound is prepared from the naphtholic coupler, 1-hydroxy-N-[2-(3-n-pentadecylphenoxy)butyl]-2-naphthamide, by a two step process involving (1) azo coupling and (2) reduction with sodium dithionite ($Na_2S_2O_4$) as described in U.S. Pat. No. 3,458,315, column 10. The above naphtholic coupler is prepared by methods analogous to those described in U.S. Pat. No. 2,474,293.

Compound B.

2-Chloro-5-(m-fluorosulfonylbenzenesulfonamido)-4-(2-methylsulfonyl-4-nitrophenylazo)-1-naphthol.

5-(m-Fluorosulfonylbenzenesulfonamido)-4-(2-methylsulfonyl-4-nitrophenylazo)-1-naphthol (52 g.) (Compound A of Example 13 of U.S. Pat. No. 3,929,760, issued Dec. 30, 1975) is chlorinated by stirring with sulfuryl chloride (200 ml.) for 21 hours at 30°–31° C. The slurry is cooled to 15° and filtered. The resulting solid is then purified by stirring successively with 800 ml. ice water, 100 ml. methanol, 200 ml. acetone (40° C.), and 300 ml. acetone (40°), filtering the resulting slurry each time (acetone precooled to 30°) and washing the solid with the same kind of solvent. The yield is 40.3 g.

EXAMPLE 3

Table I lists examples of dye-releasing redox (DRR) compounds of the invention including those prepared in Examples 1 and 2. Data pertaining to these compounds are shown in Table II.

In general the dyes and dye-releasing redox compounds of the invention are prepared by known methods as exemplified above and further exemplified in our U.S. Pat. No. 3,942,987, issued Mar. 9, 1976. The starting compounds are either well known in the art or are prepared by known methods. The diazotization and coupling reactions used in making the DRR compounds were carried out as described in Fierz-David and Blangley, *Processes of Dye Chemistry*, translated from the 5th Austrian Edition by P. W. Vittum, N.Y., Interscience Publishers, Inc., 1949.

Table II shows the absorption, diffusion, and light stability data for the released dyes corresponding to the dye-releasing redox compounds of Table I. The substituents listed under the column -(Car-) represent the radicals remaining after the carrier releases the diffusible dye.

The spectra and light stability tests were measured on a dyed film strip containing a mixture of gelatin and mordant, poly(styrene-CO-N-vinylbenzyl-N,N,N-trihexylammonium chloride), which was coated at 2.2 g./m² of each component on a polyester support.

The dyes were first dissolved in 0.1 N sodium hydroxide (a few drops of dimethylformamide were needed in some cases). A strip of undyed mordant was immersed in the dye solution until the dye was absorbed by the mordant to a density of approximately 1.5 to 2.0. The strip was then placed in a standard aqueous buffer solution of the pH indicated in the table, equilibrated for 1 minute, and dried.

A. Spectrophotometry — The spectra of the released dyes, when absorbed to the mordant on a transparent support, were measured spectrophotometrically. The maximum wavelength ($\lambda max$) and the bandwidth in nm. at one-half the density at the $\lambda max$ of the curve for each dye is also given in the table. This "half bandwidth" along with the $\lambda max$ is indicative of hue, the brightness and purity of color being greater, the smaller the half bandwidth.

B. Light Stability — The light stability was determined by irradiation of a dyed film strip according to the following method:

1. Exposure to a "simulated average northern skylight" (SANS) test for 7 days: a high intensity 6000 W. Xenon arc lamp (ANSI specification PH 1.42-1969) unit irradiating the sample with 5380 lux at 21° C. and 45% relative humidity.

The optical density was measured at $\lambda max$ both before ($D_o$) and after (D) exposure. These values and the percentage loss are given in Table II.

C. Dye-transfer in receiving element — Samples of emulsion coating containing the image dye-providing compounds were fogged by exposure to light and processed by passing them as a "sandwich" with an image receiving element and viscous developing composition (goo) between a pair of juxtaposed pressure-applying rollers. The developer layer thickness of the resulting laminate ranged from about 0.075 to 0.10 mm. The receiving element had the following structure (the coverages in mg./dm² are shown in parenthesis):

---

Gelatin (4.3)
Carbon (27) + Gelatin (17)
$TiO_2$ (25) + Gelatin (22)
Mordant* (22) + Gelatin (22)
Cellulose acetate support

*Same as above.

---

The "goo" contained 20 g. sodium hydroxide, 0.75 g. 4-hydroxymethyl-4-methyl-1-phenyl-3-pyrazolidone, 10 g. potassium bromide and 25 g. hydroxyethylcellulose, all per liter of solution. Upon application of the goo to the fogged emulsion layer, the dyes are released and diffuse through the carbon and titania layers to the mordant layer. The density of the dyes on the mordant layer was read through the support by means of a reflection densitometer after intervals of 30, 60 and 120 seconds at 24° C. The increase in density, as indicated by the values in the table, is a measure of the rate of release and also of the diffusivity of the dyes. The three figures given in the table are percentages of the densities read at these intervals in relation to the eventual maximum density (Dmax). Most of the dyes measured showed at least 70% diffusion after 60 seconds and after 120 seconds.

EXAMPLE 4

Dyes such as those released from the previously discussed carriers (Car-) during alkaline processing were prepared and dissolved in 30 ml. of a 0.5N sodium hydroxide solution containing 30 g./l. of hydroxyethylcellulose. Each solution was spread between a cellulose acetate cover sheet and a receiving element so that the alkaline dye composition was 0.1 mm thick. The receiving element was as described in Example 12 only having an additional layer of gelatin (43 mg/dm²) coated over the carbon-gelatin layer. The spectra of the

TABLE I

Cyan DRR Compounds

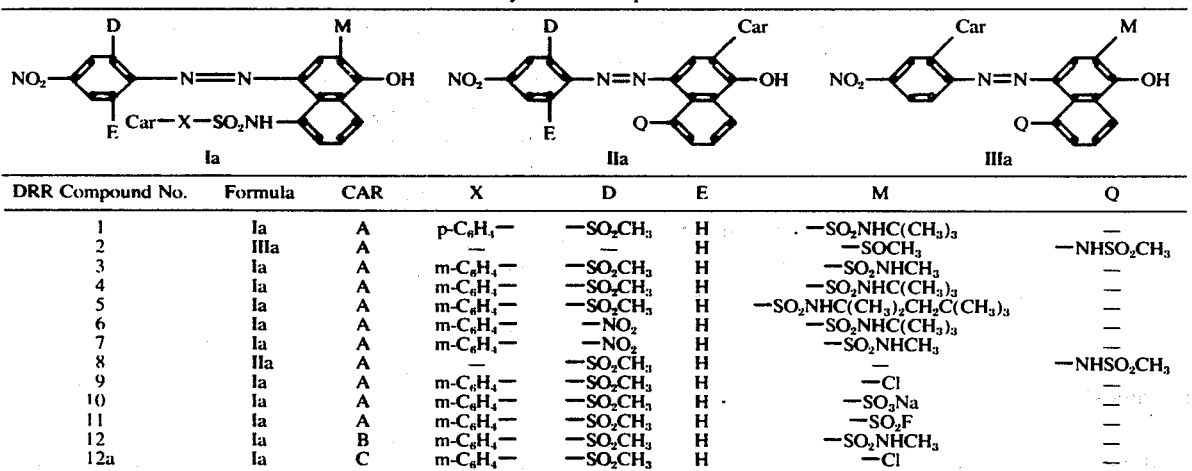

| DRR Compound No. | Formula | CAR | X | D | E | M | Q |
|---|---|---|---|---|---|---|---|
| 1 | Ia | A | p-$C_6H_4$— | —$SO_2CH_3$ | H | —$SO_2NHC(CH_3)_3$ | — |
| 2 | IIIa | A | — | — | — | —$SOCH_3$ | —$NHSO_2CH_3$ |
| 3 | Ia | A | m-$C_6H_4$— | —$SO_2CH_3$ | H | —$SO_2NHCH_3$ | — |
| 4 | Ia | A | m-$C_6H_4$— | —$SO_2CH_3$ | H | —$SO_2NHC(CH_3)_3$ | — |
| 5 | Ia | A | m-$C_6H_4$— | —$SO_2CH_3$ | H | —$SO_2NHC(CH_3)_2CH_2C(CH_3)_3$ | — |
| 6 | Ia | A | m-$C_6H_4$— | —$NO_2$ | H | —$SO_2NHC(CH_3)_3$ | — |
| 7 | Ia | A | m-$C_6H_4$— | —$NO_2$ | H | —$SO_2NHCH_3$ | — |
| 8 | IIa | A | — | —$SO_2CH_3$ | H | — | —$NHSO_2CH_3$ |
| 9 | Ia | A | m-$C_6H_4$— | —$SO_2CH_3$ | H | —Cl | — |
| 10 | Ia | A | m-$C_6H_4$— | —$SO_2CH_3$ | H | —$SO_3Na$ | — |
| 11 | Ia | A | m-$C_6H_4$— | —$SO_2CH_3$ | H | —$SO_2F$ | — |
| 12 | Ia | B | m-$C_6H_4$— | —$SO_2CH_3$ | H | —$SO_2NHCH_3$ | — |
| 12a | Ia | C | m-$C_6H_4$— | —$SO_2CH_3$ | H | —Cl | — |

CAR Identification

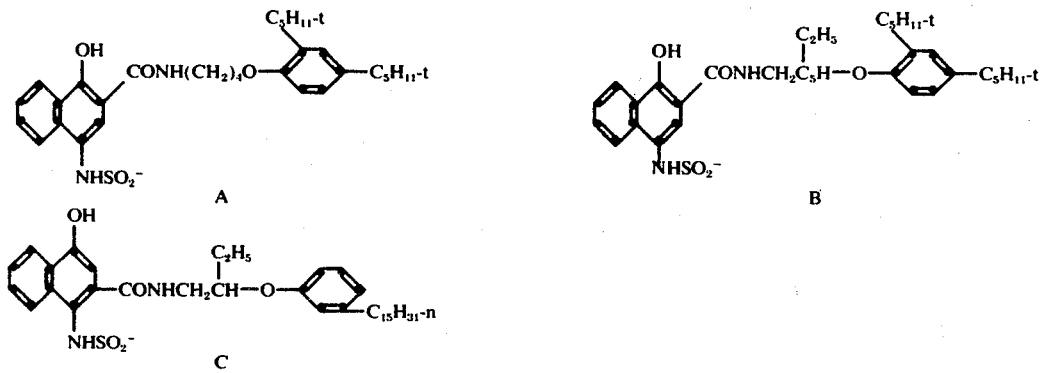

TABLE II

Released Dyes Corresponding to DRR Compounds of Table I

| | | | Absorption | | Diffusivity (Sec. % of Final) | | | | Light Stability | | |
|---|---|---|---|---|---|---|---|---|---|---|---|
| Dye No. | -(Car-) | pH | λmax nm | ½BW (nm) | 30 | 60 | 120 | pH | $D_o$ | D | Loss-% |
| 1 | b | 4 | 649 | 93 | 43 | 70 | 91 | 4 | 1.35 | 1.27 | 6 |
| 2 | —$SO_2NH_2$ | 4 | 649 | 125 | — | — | — | 4 | 1.00 | 0.82 | 18 |
| 3 | a | 4 | 647 | 98 | 49 | 76 | 96 | 4 | 2.28 | 2.06 | 10 |
| 4 | a | 4 | 643 | 110 | 41 | 66 | 89 | 4 | 1.93 | 1.81 | 7 |
| 5 | a | 5 | 646 | 100 | 41 | 65 | 86 | 4 | 1.60 | 1.31 | 18 |
| 6 | a | 4 | 652 | 97 | 39 | 60 | 82 | 4 | 1.75 | 1.11 | 36 |
| 7 | a | 4 | 650 | 102 | 45 | 70 | 90 | 4 | 2.38 | 1.96 | 18 |
| 8 | —$SO_2NH_2$ | 4 | 648 | 106 | 46 | 72 | 90 | 4 | 1.55 | 1.42 | 8 |
| 9 | a | 4 | 652 | 118 | 34 | 59 | 80 | 4 | 1.21 | 0.96 | 20 |
| 10 | a | 4 | 637 | — | 42 | 70 | 94 | — | — | — | — |
| 11 | a | 4 | 639 | — | 39 | 67 | 93 | — | — | — | — |
| 12 | a | 4 | 647 | 98 | 49 | 76 | 96 | 4 | 2.28 | 2.06 | 10 |
| 12a | a | 4 | 652 | 118 | 34 | 59 | 80 | 4 | 1.21 | 0.96 | 20 |

$^1$a = $NHSO_2$—m-$C_6H_4$—$SO_2NH_2$.
b = $NHSO_2$—p-$C_6H_4$—$SO_2NH_2$.

dyes when adsorbed to the mordant were determined as in Example 3. The following Table III shows the general formula of the dyes tested and the results obtained.

TABLE III

Released Dyes $$NO_2 - \underset{E}{\overset{D'}{\bigcirc}} - N = N - \underset{Q'}{\overset{M'}{\bigcirc}} - OH$$

| Dye No. | D' | E | M' | Q' | pH | Absorption λmax nm | ½ BW (nm) |
|---|---|---|---|---|---|---|---|
| 13 | —SO₂CH₃ | H | —SO₂(CH₂)₃SO₂NH₂ | —NHSO₂CH₃ | 4 | 648 | 88 |
| 14 | —SO₂CH₃ | H | d | —NHSO₂CH₃ | 4 | 650 | 93 |
| 15 | c | H | —SO₂NHC(CH₃)₃ | —NHSO₂CH₃ | 4 | 645 | 84 |
| 16 | —SO₂NH₂ | H | —SO₂NHC(CH₃)₃ | —NHSO₂CH₃ | 4 | 645 | 102 |
| 17 | —SO₂CH₃ | H | —SO₂NHCH₃ | a | 4 | 648 | 98 |
| 18 | —SO₂CH(CH₃)₂ | H | —SO₂NHC(CH₃)₃ | b | 4 | 651 | 92 |
| 19 | —SO₂(CH₂)₅CH₃ | H | —SO₂NHC(CH₃)₃ | b | 4 | 649 | 93 |
| 20 | —SO₂(CH₂)₅CH₃ | H | —SO₂NHC(CH₃)₃ | b | 4 | 649 | 95 |
| 21 | —SO₂NHC(CH₃)₃ | H | —SO₂NHC(CH₃)₃ | b | 4 | 642 | 95 |
| 22 | —NO₂ | H | —SO₂NHC(CH₃)₃ | b | 4 | 652 | 103 |
| 23 | —Cl | H | —SO₂NHC(CH₃)₃ | a | 4 | 643 | 119 |
| 24 | —CF₃ | H | —SO₂NHC(CH₃)₃ | b | 4 | 647 | 105 |
| 25 | —CF₃ | H | —SO₂NHC(CH₃)₃ | a | 4 | 647 | 107 |
| 26 | —NO₂ | Cl | —SO₂NHC(CH₃)₃ | a | 4 | 653 | 120 |
| 27 | —NO₂ | Cl | —SO₂NHC(CH₃)₃ | b | 4 | 653 | 124 |
| 28 | —SO₂CH₃ | Cl | —SO₂NHC(CH₃)₃ | a | 4 | 631 | 118 |
| 29 | —SO₂CH₃ | Cl | —SO₂NHC(CH₃)₃ | b | 4 | 630 | 118 |
| 30 | —SO₂CH₃ | H | c | —OH | 4 | 642 | 95 |
| 31 | —SO₂CH₃ | H | d | —OH | 4 | 646 | 111 |
| 32 | —Cl | H | —SO₂NH₂ | —OH | 4 | 632 | 139 |
| 33 | —SO₂CH₃ | H | —SO₂NH₂ | —NHCOCH₃ | 7 | 655 | 97 |
| 34 | —SO₂CH₃ | H | —SO₂NH₂ | —NHCO—p-C₆H₄SO₂NH₂ | 4 | 651 | 109 |
| 35 | —SO₂CH₃ | H | —SO₃H | a | 4 | 637 | |
| 36 | —SO₂CH₃ | H | —Br | a | 4 | 642 | 90 |
| 37 | —SO₂CH(CH₃)₂ | H | —Cl | a | 4 | 654 | 105 |
| 38 | —SO₂(CH₂)₃SO₂NH₂ | H | —SO₂NH(C₄H₉)ₜ | —NHSO₂CH₃ | 4 | 643 | 89 |
| 39 | —SO₂(CH₂)₃SO₂NH₂ | H | —SOCH₃ | —NHSO₂CH₃ | 4 | 647 | 114 |
| 40 | —SO₂(CH₂)₃SO₂NH₂ | H | —SOC₆H₅ | —NHSO₂CH₃ | 4 | 649 | 126 |
| 41 | —SO₂(CH₂)₃SO₂NH₂ | H | —SO₂C₆H₅ | —NHSO₂CH₃ | 4 | 651 | 126 |
| 42 | SO₂N⟨⟩O | H | —Cl | a | 4 | 648 | |
| 43 | SO₂CH₃ | H | —SOCH₃ | a | 4 | 643 | 91 |
| 44 | SO₂CH₃ | H | —SO₂NHCH(CH₂)₃ | e | 4 | 638 | — |
| 45 | —CF₃ | H | —SO₂F | a | 4 | 640 | — |
| 46 | —CF₃ | H | —SO₃Na | a | 4 | 641 | — |
| 47 | —Cl | H | —SO₂F | a | 4 | 641 | — |
| 48 | —Cl | H | —SO₃Na | a | 4 | 644 | — |
| 49 | SO₂CH₃ | H | —SO₂NH₂ | —OH | 4 | 640 | 128 | a = —NHSO₂—m-C₆H₄SO₂NH₂
b = —NHSO₂—p-C₆H₄SO₂NH₂
c = SO₂NH(CH₂)₃SO₂NH₂
d = SO₂NH—m-C₆H₄—SO₂NH₂
e = NHSO₂—m-C₆H₄—SO₂NH—m-C₆H₄SO₂NH₂

EXAMPLE 5

An integral multicolor photosensitive element is prepared by coating the following layers in the order recited on a transparent poly(ethylene terephthalate) film support (coverages in g./m² unless specified otherwise):

1. image-receiving layer of a latex of copoly[-styreneCO-N-vinylbenzy-N-benzyl-N,N-dimethylammonium sulfate co-divinylbenzene](2.2) and gelatin (2.2);

2. reflecting layer of titanium dioxide (22) and gelatin (2.2);

3. opaque layer of carbon black (2.7) and gelatin (1.7);

4. cyan image dye-providing compound (prepared in Example 2a) (0.54) having the formula

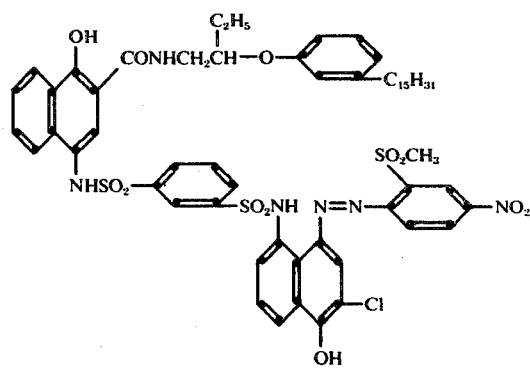

and gelatin (1.1);

5. red-sensitive, internal-image gelatin-silver bromide emulsion (1.1 silver; 1.1 gelatin), potassium 2-octadecylhydroquinone-5-sulfonate (16 g/mole silver) and nucleating agents 1-acetyl-2-4-[5-amino-2-(2,4-dit-pentylphenoxy)benzamido]phenyl hydrazine and 1-p-formylhydrazinophenyl-3-phenyl-2-thiourea (150 mg. and 6 mg/mole silver, resp.);

6. interlayer of gelatin (1.6) and 2,5-di-sec-dodecylhydroquinone (1.3);

7. Magenta image dye-providing compound (0.54) having the formula

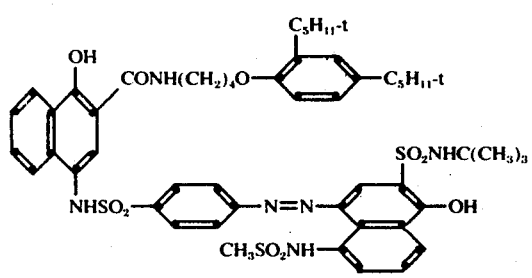

(Example 4 of U.S. Ser. No. 439,787) and gelatin (1.2);

8. green-sensitive, internal-image gelatin-silver bromide emulsion (1.25 silver, 1.3 gelatin), potassium 2-octadecylhydroquinone-5-sulfonate (16 g/mole silver) and nucleating agents 1-acetyl-2-4[5-amino-2,4-di-t-pentylphenoxy)benzamido]phenyl hydrazine and 1-formylhydrazinophenyl-3-phenyl-2-thiourea (120 mg. and 2.5 mg/mole silver, resp.);

9. interlayer of gelatin (1.6) and 2.5-di-sec-dodecylhydroquinone (1.3);

10. yellow image dye-providing compound (0.65) having the formula

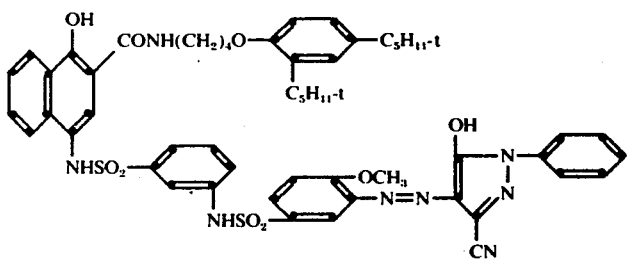

(Example 1 of U.S. Ser. No. 590,899 and gelatin (1.45);

11. blue sensitive internal-image gelatine-silver bromide emulsion (1.25 silver, 1.3 gelatin), potassium 2-octadecylhydroquinone-2-sulfonate (16 g/mole silver) and nucleating agent 1-p-formylhydrozinophenyl-3-phenyl-2-thiourea (5.8 mg/mole silver); and 12. overcoat of gelatin (0.9) and 2,5-didodecylhydroquinone (0.11).

The above silver halide emulsions are direct-positive emulsions having high internal sensitivity and low surface sensitivity of the type described in U.S. Pat. No. 3,761,276.

Samples of the above-prepared photosensitive element are then exposed to a tungsten light source through a graduated-density multicolor test object. The following processing composition is employed in a pod and is spread between each photosensitive element and a processing cover sheet by passing the transfer "sandwich" between a pair of juxtaposed pressure rollers. Samples were processed at 23° and 38° C.

| | |
|---|---|
| potassium hydroxide | 50 g. |
| 4-hydroxymethyl-4-methyl-1-phenyl-3-pyrazolidone | 12 g. |
| 5-methylbenzyltriazole | 3.8 g. |
| t-butylhydroquinone | 0.3 g. |
| methylhydroquinone | 0.1 g. |
| sodium sulfite | 1.0 g. |
| carboxymethylcellulose | 44.0 g. |
| Tamol SN dispersant | 8.8 g. |
| carbon | 172.0 g. |
| distilled water to | 1000.0 ml. |

The processing cover sheet was prepared by coating the following layers on a transparent poly(ethylene terephthalate) support:

1. A neutralizing layer of poly(butyl acrylate-co-acrylic acid) (30/70 by weight) at 21.5 g/m², described in Abel U.S. application Ser. No. 521,130, now abandoned.

2. A timing layer of a 95/5 mixture of cellulose acetate (40% acetyl) and poly(styrene-co-maleic anhydride) at 4.3 g/m², described in Abel U.S. application Ser. No. 521,221.

After about 3 hours the sensitometric curves were obtained by reflection densitometry with the following results.

| Temp. °C | Maximum Density | | | Minimum Density | | |
|---|---|---|---|---|---|---|
| | Red | Green | Blue | Red | Green | Blue |
| 23° | 1.82 | 2.05 | 1.90 | 0.26 | 0.24 | 0.26 |
| 38° | 2.22 | 2.36 | 2.05 | 0.28 | 0.29 | 0.29 |
| ΔD at 38° | +0.40 | +0.31 | +0.15 | +0.02 | +0.05 | +0.03 |

A similar element was prepared substituting the cyan image dye providing compound (Compound XLV of allowed published U.S. application Ser. No. 351,673) in layer 4.

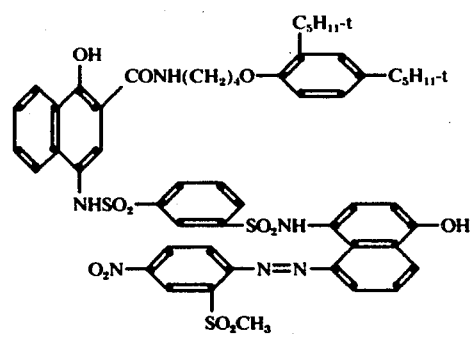

The following results were obtained by processing as above:

| Temp. °C. | Maximum Density | | | Minimum Density | | |
|---|---|---|---|---|---|---|
| | Red | Green | Blue | Red | Green | Blue |
| 23° | 2.02 | 2.04 | 1.86 | 0.24 | 0.22 | 0.24 |
| 38° | 2.23 | 2.28 | 2.04 | 0.47 | 0.33 | 0.33 |
| ΔD at 38° | +0.21 | +0.24 | +0.18 | +0.23 | 0.11 | 0.09 |

In addition to the increased light stability of the cyan image dye of the invention, there was a substantial reduction over the prior art dye in red Dmin on high temperature processing.

EXAMPLE 6

An image dye-providing compound 1 of the following structure is prepared in a manner similar to the methods described in Hinshaw et al, U.S. Ser. No. 326,628, now abandoned.

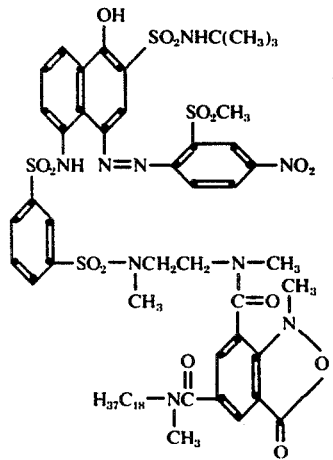

A photographic element is prepared by coating the layers on the support as follows:
1. support:
2. Layer containing 40 mg./ft.² of the above compound dissolved in 20 mg./ft.² of diethyl lauramide, 10 g./ft.² of 5-(2-cyanoethylthic)-1-phenyltetrazole dissolved in 30 mg./ft.² of tricresyl phosphate, and gelatin at 125 mg./ft.²;
3. layer containing a negative silver bromoiodide emulsion coated at 100 mg./ft.² based on silver and gelatin at 100 mg./ft.²;
4. layer containing gelatin at 50 mg./ft.².

A sample of the photographic element is exposed imagewise to a step wedge and processed in Kodak Developer DK-50 at a pH of 9.0 for 15 minutes at 20° C. The element is then washed for 5 minutes, dried, and exposed to room light. The sample is then brought into interfacial contact with an image-receiving element containing a dye mordant with a viscous processing solution inserted between the photographic element and the image-receiving element. The viscous processing solution has the formula:

| | |
|---|---|
| potassium hydroxide | 60 g. |
| hydroxyethyl cellulose | 30 g. |
| 4-hydroxymethyl-4-methyl-1-phenyl-3-pyrazolidone | 3 g. |
| sodium thiosulfate | 3 g. |
| potassium bromide | 10 g. |
| water to 1 liter | |

After 10 minutes the elements are separated. The receiver is washed and dried to provide a good negative image. The photosensitive element is washed, bleached, washed, fixed, washed and dried. A good positive cyan dye image is obtained in this element.

The invention has been described in detail with particular reference to certain preferred embodiments thereof, but it will be understood that variations and modifications can be effected within the spirit and scope of the invention.

We claim:

1. A cyan image dye-providing compound having a formula as follows:

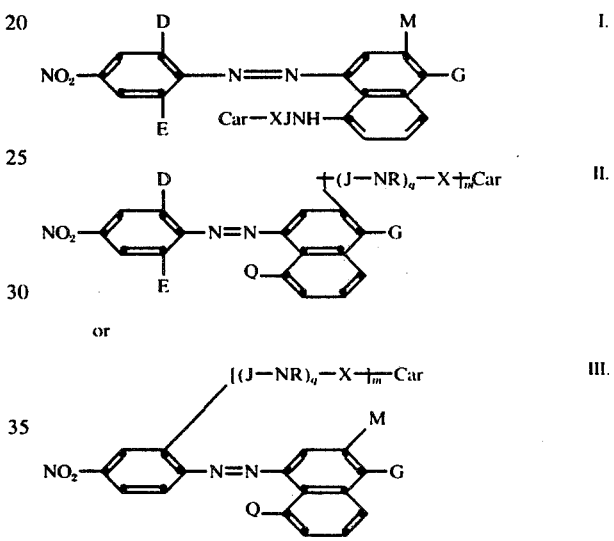

wherein

Car represents a carrier moiety which, as a function of oxidation under alkaline conditions, releases a diffusible dye from said compound and having the formula

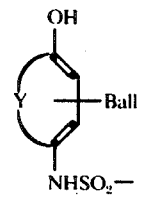

wherein

Ball represents an organic ballasting group containing at least 8 carbon atoms which renders said compound nondiffusible in a photographic element during development in an alkaline processing composition;

Y represents the carbon atoms necessary to complete a benzene or naphthalene nucleus;

X represents $-R^2-L_n-R^2_p-$ where each $R^2$ can be the same or different and each represents alkylene having 1 to about 8 carbon atoms; phenylene; or phenylene substituted with chloro, bromo, cyano, nitro, methoxy, methyl, ethyl, carboxy, or sulfo; L represents oxy, carbonyl, carboxamido, carbamoyl, sulfonamido, sulfamoyl, sulfinyl or sulfonyl; $n$ is an integer having a value of 0 or 1; $p$ is 1 when $n$ equals 1 and $p$ is 1 or 0 when $n$ equals 0, provided that when $p$ is 1 the carbon content of the sum of both $R^2$ radicals does not exceed 14 carbon atoms;

R represents hydrogen, or alkyl having 1 to about 6 carbon atoms;

J represents sulfonyl or carbonyl;

$m$ and $q$ each represent an integer having a value of 0 or 1;

Q represents hydroxy, $-NHCOR^3$ or $-NHSO_2R^3$ wherein $R^3$ is alkyl having 1 to about 6 carbon atoms, alkyl substituted with hydroxy, cyano, sulfamoyl, carboxy or sulfo; benzyl, phenyl, or phenyl substituted with carboxy, cyano, chloro, methoxy, methyl or sulfamoyl;

G represents hydroxy, an alkali metal salt thereof, a photographically inactive amine salt thereof, or a hydrolyzable acyloxy group having the formula:

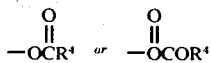

wherein $R^4$ is alkyl having 1 to about 18 carbon atoms, phenyl or phenyl substituted with chloro or nitro;

D represents halogen, cyano, nitro, trifluoromethyl, alkyl having 1 to about 6 carbon atoms, alkoxy having 1 to about 6 carbon atoms, carboxy, $-COOR^4$ wherein $R^4$ is as described previously, fluorosulfonyl, trifluoromethylsulfonyl, $-SO_3$-phenyl or $-SO_3$-phenyl substituted with hydroxy, chloro, carboxy, sulfamoyl, methyl or methoxy; sulfo, $-SO_2NR^5R^6$ wherein $R^5$ represents hydrogen or alkyl having 1 to about 6 carbon atoms and $R^6$ represents hydrogen, alkyl having 1 to about 6 carbon atoms, alkyl having 1 to about 6 carbon atoms substituted with hydroxy, cyano, sulfamoyl, carboxy or sulfo; benzyl, phenyl, phenyl substituted with hydroxy, sulfonyl, sulfamoyl, carboxy, or sulfo; alkylcarbonyl having 1 to about 8 carbon atoms, or phenylcarbonyl, with the proviso that the carbon content of the sum of $R^5$ and $R^6$ not exceed 14 carbon atoms; also $R^5$ and $R^6$ may be combined with the nitrogen atom to which they are attached to form morpholino or piperidino; $-CON(R^5)_2$ wherein each $R^5$ can be the same or different and is as described previously; alkylsulfonyl having 1 to about 8 carbon atoms, alkylsulfonyl having 1 to about 8 carbon atoms substituted with hydroxy, chloro, phenyl, cyano, sulfamoyl, carboxy or sulfo; phenylsulfonyl or phenylsulfonyl substituted with hydroxy, sulfamoyl, fluorosulfonyl, carboxy or sulfo;

E represents hydrogen, halogen, nitro, cyano or trifluoromethyl; and

M represents sulfo, cyano, fluorosulfonyl, halogen, $-SO_3$-phenyl, a $-SO_3$-phenyl substituted with hydroxy, chloro, carboxy, sulfamoyl, methyl or methoxy; alkylsulfinyl having 1 to about 8 carbon atoms, alkylsulfinyl having 1 to about 4 carbon atoms substituted with cyano, hydroxy or carboxy; phenylsulfinyl; $-SO_2NR^5R^6$, or $-CON(R^5)_2$ wherein $R^5$ and $R^6$ are as described previously; alkylsulfonyl having 1 to about 8 carbon atoms, alkylsulfonyl having 1 to about 6 carbon atoms substituted with hydroxy, chloro, phenyl, cyano, sulfamoyl, carboxy or sulfo; or phenylsulfonyl substituted with hydroxy, sulfamoyl, fluorosulfonyl, carboxy or sulfo;

with the proviso that there be no more than one sulfo radical and no more than one carboxy radical present in said compound.

2. A compound as described in claim 1 wherein

Y represents the atoms necessary to complete a naphthalene nucleus;

$R^2$ represents alkylene having 1 to about 4 carbon atoms, phenylene or phenylene substituted with carboxy, chloro, methyl or methoxy;

L represents sulfamoyl, sulfonamido, carbamoyl or carboxamido;

R represents hydrogen;

$q$ is an integer having a value of 1;

$m$ is an integer having a value of 0 or 1;

Q represents hydrogen, hydroxy, $-NHCOR^3$ or $-NHSO_2R^3$ wherein $R^3$ represents alkyl having 1 to about 4 carbon atoms; alkyl having 1 to about 4 carbon atoms substituted with hydroxy, cyano, sulfamoyl, carboxy or sulfo; benzyl, phenyl or phenyl substituted with carboxy, chloro, methyl, methoxy or sulfamoyl;

D represents chloro, fluoro, bromo, cyano, trifluoromethyl, nitro, fluorosulfonyl, trifluoromethylsulfonyl, alkylsulfonyl having 1 to about 6 carbon atoms, alkylsulfonyl having 1 to about 6 carbon atoms substituted with hydroxy, chloro, phenyl, cyano, sulfamoyl, carboxy, or sulfo; phenylsulfonyl; phenylsulfonyl substituted with hydroxy, sulfamoyl, fluorosulfonyl, carboxy or sulfo; $-SO_2NHR^6$ wherein $R^6$ is hydrogen, alkyl having 1 to about 4 carbon atoms, or alkyl having 1 to about 4 carbon atoms substituted with hydroxy, cyano, sulfamoyl, carboxy or sulfo; benzyl, phenyl or phenyl substituted with hydroxy, sulfonyl, sulfamoyl, carboxy or sulfo; $-CON(R^5)_2$ wherein $R^5$ is hydrogen or methyl, and E represents hydrogen, fluoro, or chloro; and M represents sulfo, cyano, chloro, alkylsulfonyl having 1 to about 8 carbon atoms, benzylsulfonyl, alkylsulfinyl having 1 to about 4 carbon atoms, $-CON(CH_3)_2$, $-SO_2NHR^6$ wherein $R^6$ is hydrogen, alkyl of 1 to about 4 carbon atoms; alkyl having 1 to about 6 carbon atoms substituted with hydroxy, cyano, sulfamoyl, carboxy, or sulfo; benzyl, phenyl or phenyl substituted with hydroxy, sulfamoyl, carboxy or sulfo.

3. A compound as described in claim 2 wherein $R^2$ represents alkylene having 1 to about 4 carbon atoms or phenylene;

L represents sulfamoyl or sulfonamido;

J represents sulfonyl;

Q represents hydroxy, $-NHSO_2R^3$ wherein $R^3$ is alkyl having 1 to about 4 carbon atoms, or $-NHCOCH_3$;

G represents a hydroxy or a hydrolyzable acyloxy group having the formula:

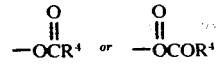

wherein $R^4$ is alkyl having 1 to about 18 carbon atoms, phenyl or phenyl substituted with chloro or nitro;

D represents chloro, bromo, cyano, trifluoromethyl, trifluoromethylsulfonyl, nitro, alkylsulfonyl having 1 to about 6 carbon atoms, or benzylsulfonyl;

E represents hydrogen; and

M represents chloro, methylsulfinyl, -SO$_2$NHR$^6$ wherein R$^6$ is alkyl having 1 to about 4 carbon atoms; or -CONH(CH$_3$)$_2$.

4. A compound as described in claim 3 wherein X represents

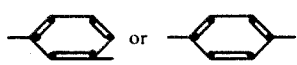

J represents sulfonyl;
G represents hydroxy; and
D represents alkylsulfonyl having 1 to about 4 carbon atoms.

5. A compound as described in claim 4 wherein -Ball is linked to the sulfonamidonaphthol nucleus through a bivalent

or —SO$_2$NH— moiety.

6. A compound as described in claim 4 wherein -Ball represents

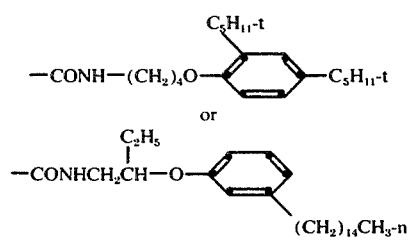

and is in the 2-position relative to the hydroxy group.

7. A compound as described in claim 4 wherein the cyan dye-providing compound has the formula

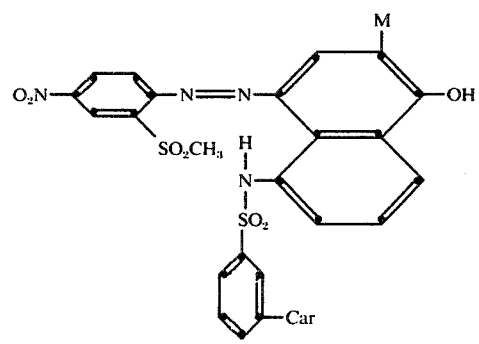

wherein M represents chloro, methylsulfinyl, -SO$_2$NHCH$_3$ or CON(CH$_3$)$_2$.

8. A compound as described in claim 4 wherein the cyan dye-providing compound has the formula

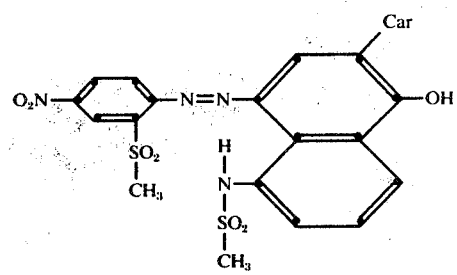

9. A cyan dye-providing compound as described in claim 5 having the formula

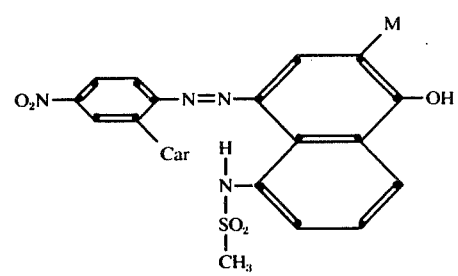

wherein M represents methylsulfinyl, chloro or —CON(CH$_3$)$_2$.

10. A cyan dye- providing compound as described in claim 6 having the formula

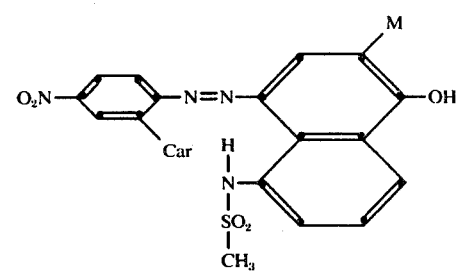

wherein M represents methylsulfinyl, chloro or -CON(CH$_3$)$_2$.

11. A cyan image dye-providing compound having a formula as follows.

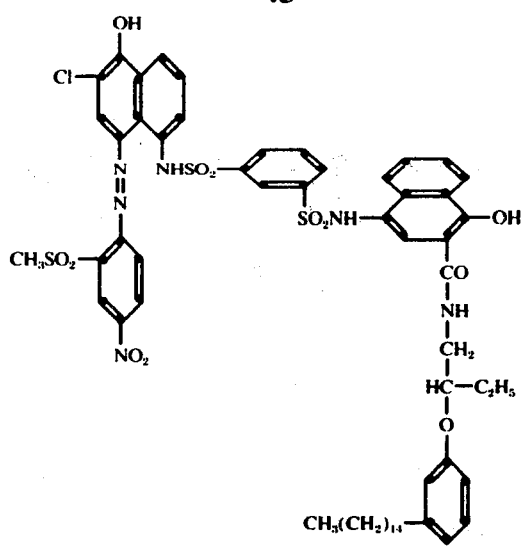
12. A cyan image dye-providing compound having a formula
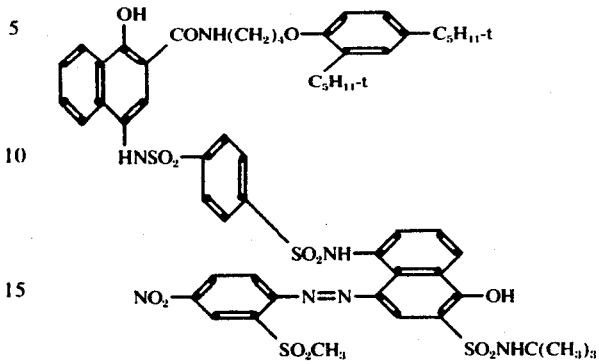
* * * * *